United States Patent
Shayevitz et al.

(10) Patent No.: US 10,171,119 B2
(45) Date of Patent: Jan. 1, 2019

(54) COMMUNICATION TERMINALS AND A METHOD FOR EXCHANGING INFORMATION BETWEEN COMMUNICATION TERMINALS IN A NOISY ENVIRONMENT

(71) Applicant: RAMOT AT TEL-AVIV UNIVERSITY LTD., Tel-Aviv (IL)

(72) Inventors: Ofer Shayevitz, Tel Aviv (IL); Assaf Ben-Yishai, Ramat Hasharon (IL)

(73) Assignee: RAMOT AT TEL AVIV UNIVERSITY, Tel Aviv (IL)

( * ) Notice: Subject to any disclaimer, the term of this patent is extended or adjusted under 35 U.S.C. 154(b) by 0 days.

(21) Appl. No.: 15/326,471

(22) PCT Filed: Jul. 23, 2015

(86) PCT No.: PCT/IL2015/050762
§ 371 (c)(1),
(2) Date: Jan. 14, 2017

(87) PCT Pub. No.: WO2016/016882
PCT Pub. Date: Feb. 4, 2016

(65) Prior Publication Data
US 2017/0346515 A1    Nov. 30, 2017

Related U.S. Application Data

(60) Provisional application No. 62/030,108, filed on Jul. 29, 2014.

(51) Int. Cl.
*H04B 1/10* (2006.01)
*H04L 1/00* (2006.01)
*H04L 27/156* (2006.01)
*H04L 27/22* (2006.01)
*H04L 27/38* (2006.01)

(52) U.S. Cl.
CPC ........... *H04B 1/1027* (2013.01); *H04L 1/005* (2013.01); *H04L 27/156* (2013.01); *H04L 27/22* (2013.01); *H04L 27/38* (2013.01)

(58) Field of Classification Search
CPC . H04B 17/345; H04L 25/0226; H04L 1/0054; H04W 24/10
USPC ........................................................ 375/316
See application file for complete search history.

(56) References Cited

U.S. PATENT DOCUMENTS 7,486,794 B2    2/2009  Pautot
2002/0094043 A1*  7/2002  Chu ..................... H04L 1/0054
                                                    375/346

(Continued)

FOREIGN PATENT DOCUMENTS

CN    103634796    3/2014
CN    103929742    7/2014
UA        27584    11/2007

OTHER PUBLICATIONS

Search Report of WO2016016882, dated Nov. 10, 2015.
(Continued)

*Primary Examiner* — Leila Malek
(74) *Attorney, Agent, or Firm* — Reches Patents

(57) ABSTRACT

A method, system and computer readable medium for transmitting data and feedback over a noisy feedforward channel and a noisy feedback channel.

19 Claims, 10 Drawing Sheets

(56) References Cited

U.S. PATENT DOCUMENTS

2002/0136400 A1    9/2002    Askerov
2012/0171965 A1    7/2012    Shen

OTHER PUBLICATIONS

C. E. Shannon, "The zero-error capacity of a noisy channel," *IEEE Trans. Inf. Theory*, vol. IT-2, pp. 8-19, Sep. 1956.

J. P. M. Schalkwijk and T. Kailath, "A coding scheme for additive noise channels with feedback part I: No bandwidth constraint," *IEEE Trans. Inf. Theory*, vol. IT-12, pp. 172-182, Apr. 1966.

J. P. M. Schalkwijk, "A coding scheme for additive noise channels with feedback part II: Band-limited signals," *IEEE Trans. Inf. Theory*, vol. IT-12, pp. 183-189, Apr. 1966.

M. Horstein, "Sequential transmission using noiseless feedback," *IEEE Trans. Info. Theory*, vol. IT-9, pp. 136-143, Jul. 1963.

O. Shayevitz and M. Feder, "Optimal feedback communication via posterior matching," *IEEE Trans. Inf. Theory*, vol. 57, No. 3, pp. 1186-1222, Mar. 2011.

Y.-H. Kim, A. Lapidoth, and T. Weissman, "On the reliability of Gaussian channels with noisy feedback," in *Proc. 41st Allerton Conf. Communication, Control Computing*, Sep. 2006, pp. 364-371.

Z. Chance and D. J. Love, "Concatenated coding for the AWGN channel with noisy feedback," *IEEE Trans. Inf. Theory*, vol. 57, pp. 6633-6649, Oct. 2011.

A. Sato and H. Yamamoto, "Error exponents of discrete memoryless channels and awgn channels with noisy feedback," in *ISITA*, 2010, pp. 452-457.

M. V. Burnashev and H. Yamamoto, "On reliability function of BSC with noisy feedback," *Problems of Information Transmission*, vol. 46, pp. 2-23, 2010.

M. V. Burnashev and H. Yamamoto, "Noisy feedback improves the gaussian channel reliability function," in *ISIT*, 2014, pp. 2554-2558.

M. Tomlinson, "New automatic equalizer employing modulo arithmetic," *Electronics Letters*, vol. 7, No. 5, pp. 138-139, 1971.

H. Harashima and H. Miyakawa, "Matched-transmission technique for channels with intersymbol interference," *IEEE Transactions on Communications*, vol. 20, No. 4, pp. 774-780, 1972.

Y. Kochman and R. Zamir, "Joint Wyner-Ziv/Dirty-Paper Coding by Analog Modulo-Lattice Modulation," IEEE Trans. Inf. Theory, vol. 55, pp. 4878-4889, 2009.

Kin-Kwong Leung, Chi Wan Sung "An Opportunistic Power Control Algorithm for Cellular Network" IEEE/ACM Transactions on Networking, vol. 14, No. 3, Jun. 2006.

Assaf Ben-Yishai and Ofer Shayevitz "The Gaussian Channel with Noisy Feedback: Near-Capacity Performance via Simple Interaction". Fifty-second Annual Allerton Conference Allerton House, UIUC, Illinois, USA Oct. 1-3, 2014.

Assaf Ben-Yishai and Ofer Shayevitz "Interactive Schemes for the AWGN Channel with Noisy Feedback".

Abdellatif Zaidi, Mohamed Ali Moussa, Roy Timo "Bounds on the Benefits of Interaction in Distributed Source Coding for Function Computation", 2015 International Symposium on Wireless Communication Systems (ISWCS), Aug. 25-28, 2015. INSPEC Accession No. 15936232.

\* cited by examiner

COMMUNICATION TERMINALS AND A METHOD FOR EXCHANGING INFORMATION BETWEEN COMMUNICATION TERMINALS IN A NOISY ENVIRONMENT

RELATED APPLICATIONS

This application claims priority from U.S. provisional patent Ser. No. 62/030,108 filing date Jul. 29, 2014 which is incorporated herein by reference.

BACKGROUND

The following documents are referred to in this document:
[1] C. E. Shannon, "The zero-error capacity of a noisy channel," *IEEE Trans. Inf. Theory*, vol. IT-2, pp. 8-19, September 1956.
[2] J. P. M. Schalkwijk and T. Kailath, "A coding scheme for additive noise channels with feedback part I: No bandwidth constraint," *IEEE Trans. Inf. Theory*, vol. IT-12, pp. 172-182, April 1966.
[3] J. P. M. Schalkwijk, "A coding scheme for additive noise channels with feedback part II: Band-limited signals," *IEEE Trans. Inf. Theory*, vol. IT-12, pp. 183-189, April 1966.
[4] M. Horstein, "Sequential transmission using noiseless feedback," *IEEE Trans. Info. Theory*, vol. IT-9, pp. 136-143, July 1963.
[5] O. Shayevitz and M. Feder, "Optimal feedback communication via posterior matching," *IEEE Trans. Inf. Theory*, vol. 57, no. 3, pp. 1186-1222, March 2011.
[6] Y.-H. Kim, A. Lapidoth, and T. Weissman, "On the reliability of Gaussian channels with noisy feedback," in *Proc. 41st Allerton Conf. Communication, Control Computing*, September 2006, pp. 364-371.
[7] Z. Chance and D. J. Love, "Concatenated coding for the AWGN channel with noisy feedback," *IEEE Trans. Inf. Theory*, vol. 57, pp. 6633-6649, October 2011.
[8] A. Sato and H. Yamamoto, "Error exponents of discrete memoryless channels and awgn channels with noisy feedback," in *ISITA,* 2010, pp. 452-457.
[9] M. V. Burnashev and H. Yamamoto, "On reliability function of BSC with noisy feedback," *Problems of Information Transmission*, vol. 46, pp. 2-23, 2010.
[10] M. V. Burnashev and H. Yamamoto, "Noisy feedback improves the gaussian channel reliability function," in *ISIT,* 2014, pp. 2554-2558.
[11] M. Tomlinson, "New automatic equalizer employing modulo arithmetic," *Electronics Letters*, vol. 7, no. 5, pp. 138-139, 1971.
[12] H. Harashima and H. Miyakawa, "Matched-transmission technique for channels with intersymbol interference," *IEEE Transactions on Communications*, vol. 20, no. 4, pp. 774-780, 1972.
[13] Y. Kochman and R. Zamir, "Joint Wyner-Ziv/Dirty-Paper Coding by Analog Modulo-Lattice Modulation," IEEE Trans. Inf. Theory, vol. 55, pp. 4878-4889, 2009.

Feedback cannot improve the capacity of point-to-point memoryless channels [1]. Nevertheless, noiseless feedback can significantly simplify the transmission schemes and improve the error probability performance, see e.g. [2]-[5]. These elegant schemes fail however in the presence of arbitrarily small feedback noise, rendering them grossly impractical. This fact has been initially observed in [3] for the Additive White Gaussian Noise (AWGN) channel, and further strengthened in [6]. A handful of works have tackled the problem of noisy feedback as means for improving error performance, see e.g. [7]-[10]. However, these works attain their superior error performance at the cost of a significant increase in complexity w.r.t. their noiseless feedback counterparts. There appears to be no simple scheme (in the spirit of [3]-[5]) that is robust to feedback noise known hitherto.

SUMMARY

There are provided systems, methods and non-transitory computer readable media for decoding one or more component codes, as illustrated in the claims.

According to an embodiment of the invention there may be provided a method that may include receiving, by a second terminal, a first received signal; wherein the first received signal represents a first transmitted signal that was transmitted from a first terminal and propagated over a noisy feedforward channel; wherein the first transmitted signal represents a portion of a message; calculating, by the second terminal, a first estimate of the portion of the message; calculating, by the second terminal, a representation of the first estimate; wherein the calculating may include applying a second modulo function; transmitting, by the second terminal, over a feedback channel, the representation of the first estimate; repeating, for each iteration out of multiple iterations, the steps of: receiving, by a second terminal, a current received signal; wherein the current received signal represents an estimated error; wherein the estimated error was calculated by the first terminal in response to an outcome of a pervious iteration and may include applying a first modulo function; calculating, by the second terminal, and in response to the current received signal, a current estimate of the message; calculating, by the second terminal, a representation of the current estimate; wherein the calculating may include applying the second modulo function; and transmitting, by the second terminal and over the feedback channel, a representation of the current estimate; and estimating the portion of the message, by the second terminal, and after a completion of the multiple iterations, wherein the estimating of the message is responsive to at least one outcome of at least one iteration.

According to an embodiment of the invention there may be provided a method that may include receiving, by a second terminal, a first received signal; wherein the first received signal represents a first transmitted signal that was transmitted from a first terminal and propagated over a noisy feedforward channel; wherein the first transmitted signal is a dummy signal; calculating, by the second terminal, a first estimate of the dummy signal; calculating, by the second terminal, a representation of the first estimate; of the dummy signal wherein the calculating may include applying a second modulo function; transmitting, by the second terminal, over a feedback channel, the representation of the first estimate; repeating, for each iteration out of multiple iterations, the steps of: receiving, by a second terminal, a current received signal; wherein the current received signal represents an estimated error; wherein the estimated error was calculated by the first terminal in response to an outcome of a pervious iteration and in response to a portion of a message and may include applying a first modulo function; calculating, by the second terminal, and in response to the current received signal, a current estimate of the message; calculating, by the second terminal, a representation of the current estimate; wherein the calculating may include applying the second modulo function; and transmitting, by the second terminal and over the feedback channel, a representation of the current estimate; and estimating the portion of the message, by the second terminal, and after a completion of the multiple iterations, wherein the estimating of the message is responsive to at least one outcome of at least one iteration.

According to an embodiment of the invention there may be provided a method that may include transmitting a transmitted signal, by a first terminal and over a noisy feedforward channel; wherein the first transmitted signal represents a portion of a message; receiving, by a second terminal, a first received signal; wherein the first received signal represents the first transmitted signal; calculating, by the second terminal, a first estimate of the portion of the message; calculating, by the second terminal, a representation of the first estimate; wherein the calculating may include applying a second modulo function; transmitting, by the second terminal, over a feedback channel, the representation of the first estimate; repeating, for each iteration out of multiple iterations, the steps of: calculating, by the first terminal, an estimated error in response to an outcome of a previous iteration; wherein the calculating may include applying a first modulo function; receiving, by a second terminal, a current received signal; wherein the current received signal represents the estimated error; calculating, by the second terminal, and in response to the current received signal, a current estimate of the portion of the message; calculating, by the second terminal, a representation of the current estimate; wherein the calculating may include applying the second modulo function; and transmitting, by the second terminal and over the feedback channel, a representation of the current estimate; and estimating the portion of the message, by the second terminal, and after a completion of the multiple iterations, wherein the estimating of the message is responsive to at least one outcome of at least one iteration.

According to an embodiment of the invention there may be provided a method that may include transmitting a transmitted signal, by a first terminal and over a noisy feedforward channel; wherein the first transmitted signal is a dummy signal; receiving, by a second terminal, a first received signal; wherein the first received signal represents the first transmitted signal; calculating, by the second terminal, a first estimate of the dummy signal; calculating, by the second terminal, a representation of the first estimate; wherein the calculating may include applying a second modulo function; transmitting, by the second terminal, over a feedback channel, the representation of the first estimate; repeating, for each iteration out of multiple iterations, the steps of: calculating, by the first terminal, an estimated error in response to an outcome of a previous iteration and in response to a content of a portion of a message; wherein the calculating may include applying a first modulo function; receiving, by a second terminal, a current received signal; wherein the current received signal represents the estimated error; calculating, by the second terminal, and in response to the current received signal, a current estimate of the portion of the message; calculating, by the second terminal, a representation of the current estimate; wherein the calculating may include applying the second modulo function; and transmitting, by the second terminal and over the feedback channel, a representation of the current estimate; and estimating the portion of the message, by the second terminal, and after a completion of the multiple iterations, wherein the estimating of the message is responsive to at least one outcome of at least one iteration.

According to an embodiment of the invention there may be provided a method that may include transmitting, by a first terminal and over a noisy feedforward channel, a first transmitted signal, thereby allowing the second terminal to receive a first received signal; wherein the first transmitted signal represents a portion of a message; receiving, by the first terminal, a second received signal, wherein the second received signal results from a propagation, over a noisy feedback channel, of a representation of a first estimate of at the least portion of the message; wherein the representation of the first estimate is calculated by the second terminal, wherein the calculation of the representation of the first estimate may include applying a second modulo function; repeating, for each iteration out of multiple iterations, the steps of: calculating, by the first terminal, an estimated error, wherein the calculating is responsive to an outcome of a pervious iteration and may include applying a first modulo function; transmitting the estimate error to the second terminal over the noisy feedforward channel; and receiving, by the first terminal and over the feedback channel, a representation of the current estimate.

According to an embodiment of the invention there may be provided a non-transitory computer readable medium that stores instructions that once executed by a second terminal, causes the second terminal to perform the steps of: receiving, by a second terminal, a first received signal; wherein the first received signal represents a first transmitted signal that was transmitted from a first terminal and propagated over a noisy feedforward channel; wherein the first transmitted signal represents a portion of a message; calculating, by the second terminal, a first estimate of the portion of the message; calculating, by the second terminal, a representation of the first estimate; wherein the calculating may include applying a second modulo function; transmitting, by the second terminal, over a feedback channel, the representation of the first estimate; repeating, for each iteration out of multiple iterations, the steps of: receiving, by a second terminal, a current received signal; wherein the current received signal represents an estimated error; wherein the estimated error was calculated by the first terminal in response to an outcome of a pervious iteration and may include applying a first modulo function; calculating, by the second terminal, and in response to the current received signal, a current estimate of the message; calculating, by the second terminal, a representation of the current estimate; wherein the calculating may include applying the second modulo function; and transmitting, by the second terminal and over the feedback channel, a representation of the current estimate; and estimating the portion of the message, by the second terminal, and after a completion of the multiple iterations, wherein the estimating of the message is responsive to at least one outcome of at least one iteration.

According to an embodiment of the invention there may be provided a non-transitory computer readable medium that stores instructions that once executed by a second terminal, causes the second terminal to perform the steps of: receiving, by a second terminal, a first received signal; wherein the first received signal represents a first transmitted signal that was transmitted from a first terminal and propagated over a noisy feedforward channel; wherein the first transmitted signal is a dummy signal; calculating, by the second terminal, a first estimate of the dummy signal; calculating, by the second terminal, a representation of the first estimate; of the dummy signal wherein the calculating may include applying a second modulo function; transmitting, by the second terminal, over a feedback channel, the representation of the first estimate; repeating, for each iteration out of multiple iterations, the steps of: receiving, by a second terminal, a current received signal; wherein the current received signal represents an estimated error; wherein the estimated error was calculated by the first terminal in response to an outcome of a pervious iteration and in response to a portion of a message and may include applying a first modulo function; calculating, by the second terminal, and in response to the current received signal, a current estimate of the message; calculating, by the second terminal, a representation of the current estimate; wherein the calculating may include applying the second modulo function; and transmitting, by the second terminal and over the feedback channel, a representation of the current estimate; and estimating the portion of the message, by the second terminal, and after a completion of the multiple iterations, wherein the estimating of the message is responsive to at least one outcome of at least one iteration.

According to an embodiment of the invention there may be provided a non-transitory computer readable medium that stores instructions that once executed by a first terminal and a second terminal, causes the first terminal and the second terminal to perform the steps of: transmitting a transmitted signal, by a first terminal and over a noisy feedforward channel; wherein the first transmitted signal represents a portion of a message; receiving, by a second terminal, a first received signal; wherein the first received signal represents the first transmitted signal; calculating, by the second terminal, a first estimate of the portion of the message; calculating, by the second terminal, a representation of the first estimate; wherein the calculating may include applying a second modulo function; transmitting, by the second terminal, over a feedback channel, the representation of the first estimate; repeating, for each iteration out of multiple iterations, the steps of: calculating, by the first terminal, an estimated error in response to an outcome of a previous iteration; wherein the calculating may include applying a first modulo function; receiving, by a second terminal, a current received signal; wherein the current received signal represents the estimated error; calculating, by the second terminal, and in response to the current received signal, a current estimate of the portion of the message; calculating, by the second terminal, a representation of the current estimate; wherein the calculating may include applying the second modulo function; and transmitting, by the second terminal and over the feedback channel, a representation of the current estimate; and estimating the portion of the message, by the second terminal, and after a completion of the multiple iterations, wherein the estimating of the message is responsive to at least one outcome of at least one iteration.

According to an embodiment of the invention there may be provided a non-transitory computer readable medium that stores instructions that once executed by a first terminal and a second terminal, causes the first terminal and the second terminal to perform the steps of: transmitting a transmitted signal, by a first terminal and over a noisy feedforward channel; wherein the first transmitted signal is a dummy signal; receiving, by a second terminal, a first received signal; wherein the first received signal represents the first transmitted signal; calculating, by the second terminal, a first estimate of the dummy signal; calculating, by the second terminal, a representation of the first estimate; wherein the calculating may include applying a second modulo function; transmitting, by the second terminal, over a feedback channel, the representation of the first estimate; repeating, for each iteration out of multiple iterations, the steps of: calculating, by the first terminal, an estimated error in response to an outcome of a previous iteration and in response to a content of a portion of a message; wherein the calculating may include applying a first modulo function; receiving, by a second terminal, a current received signal; wherein the current received signal represents the estimated error; calculating, by the second terminal, and in response to the current received signal, a current estimate of the portion of the message; calculating, by the second terminal, a representation of the current estimate; wherein the calculating may include applying the second modulo function; and transmitting, by the second terminal and over the feedback channel, a representation of the current estimate; and estimating the portion of the message, by the second terminal, and after a completion of the multiple iterations, wherein the estimating of the message is responsive to at least one outcome of at least one iteration.

According to an embodiment of the invention there may be provided a non-transitory computer readable medium that stores instructions that once executed by a first terminal, causes the first terminal to perform the steps of: transmitting, by a first terminal and over a noisy feedforward channel, a first transmitted signal, thereby allowing the second terminal to receive a first received signal; wherein the first transmitted signal represents a portion of a message; receiving, by the first terminal, a second received signal, wherein the second received signal results from a propagation, over a noisy feedback channel, of a representation of a first estimate of at the least portion of the message; wherein the representation of the first estimate is calculated by the second terminal, wherein the calculation of the representation of the first estimate may include applying a second modulo function; repeating, for each iteration out of multiple iterations, the steps of: calculating, by the first terminal, an estimated error, wherein the calculating is responsive to an outcome of a pervious iteration and may include applying a first modulo function; transmitting the estimate error to the second terminal over the noisy feedforward channel; and receiving, by the first terminal and over the feedback channel, a representation of the current estimate.

According to an embodiment of the invention there may be provided a second terminal that may include a processor, a receiver and a transmitter, wherein the receiver may be configured to receive a first received signal; wherein the first received signal represents a first transmitted signal that was transmitted from a first terminal and propagated over a noisy feedforward channel; wherein the first transmitted signal represents a portion of a message; wherein the processor may be configured to calculate a first estimate of the portion of the message; calculate a representation of the first estimate; wherein the calculating may include applying a second modulo function; wherein the transmitter may be configured to transmit over a feedback channel, the representation of the first estimate; wherein the second terminal may be configured to repeat, for each iteration out of multiple iterations, the steps of: receiving, by the receiver, a current received signal; wherein the current received signal represents an estimated error; wherein the estimated error was calculated by the first terminal in response to an outcome of a pervious iteration and may include applying a first modulo function; calculating, by the processor, and in response to the current received signal, a current estimate of the message; calculating, by the processor, a representation of the current estimate; wherein the calculating may include applying the second modulo function; and transmitting, by the transmitter and over the feedback channel, a representation of the current estimate; wherein the processor is further configured to estimate the portion of the message after a completion of the multiple iterations, wherein the estimating of the message is responsive to at least one outcome of at least one iteration.

According to an embodiment of the invention there may be provided a second terminal that may include a processor, a receiver and a transmitter, wherein the receiver may be configured to receive a first received signal; wherein the first received signal represents a first transmitted signal that was transmitted from a first terminal and propagated over a noisy feedforward channel; wherein the first transmitted signal is a dummy signal; wherein the processor may be configured to calculate a first estimate of the dummy signal, and calculate a representation of the first estimate; of the dummy signal wherein the calculating may include applying a second modulo function; wherein the transmitter may be configured to transmit, over a feedback channel, the representation of the first estimate; wherein the second terminal may be configured to repeat, for each iteration out of multiple iterations, the steps of: receiving, by a second terminal, a current received signal; wherein the current received signal represents an estimated error; wherein the estimated error was calculated by the first terminal in response to an outcome of a pervious iteration and in response to a portion of a message and may include applying a first modulo function; calculating, by the second terminal, and in response to the current received signal, a current estimate of the message; calculating, by the second terminal, a representation of the current estimate; wherein the calculating may include applying the second modulo function; and transmitting, by the second terminal and over the feedback channel, a representation of the current estimate; and wherein the processor may be configured to estimate the portion of the message after a completion of the multiple iterations, wherein the estimating of the message is responsive to at least one outcome of at least one iteration.

According to an embodiment of the invention there may be provided a system may include a first terminal and a second terminal, wherein the first terminal may include a first processor, a first receiver and a first transmitter; wherein the second terminal may include a second processor, a second receiver and a second transmitter; wherein the first transmitter may be configured to transmit a transmitted signal over a noisy feedforward channel; wherein the first transmitted signal represents a portion of a message; wherein the second receiver may be configured to receive a first received signal; wherein the first received signal represents the first transmitted signal; wherein the second processor may be configured to calculate a first estimate of the portion of the message and to calculate a representation of the first estimate; wherein the calculating may include applying a second modulo function; wherein the second transmitter may be configured to transmit, over a feedback channel, the representation of the first estimate; wherein the first and second terminals are configured to repeat, for each iteration out of multiple iterations, the steps of: calculating, by the first processor, an estimated error in response to an outcome of a previous iteration; wherein the calculating may include applying a first modulo function; receiving, by a second receiver, a current received signal; wherein the current received signal represents the estimated error; calculating, by the second processor, and in response to the current received signal, a current estimate of the portion of the message; calculating, by the second processor, a representation of the current estimate; wherein the calculating may include applying the second modulo function; and transmitting, by the second transmitter and over the feedback channel, a representation of the current estimate; wherein the second processor may be configured to estimate the portion of the message, after a completion of the multiple iterations, wherein the estimating of the message is responsive to at least one outcome of at least one iteration. Blocks 21-24 of FIG. 2 are non-limiting examples of operations executed by a first (hardware) processor of a first terminal Blocks 31-35 of FIG. 2 are non-limiting examples of operations executed by a (second) hardware processor of a second terminal. The first terminal is coupled to the feedforward channel via a (first) transmitter and to the feedback channel via a (first) receiver. The second terminal is coupled to the feedforward channel via a (second) receiver and to the feedback channel via a (second) transmitter.

According to an embodiment of the invention there may be provided a system may include a first terminal and a second terminal, wherein the first terminal may include a first processor, a first receiver and a first transmitter; wherein the second terminal may include a second processor, a second receiver and a second transmitter; wherein the first transmitter may be configured to transmit a transmitted signal over a noisy feedforward channel; wherein the first transmitted signal is a dummy signal; wherein the second receiver may be configured to receive a first received signal; wherein the first received signal represents the first transmitted signal; wherein the second processor may be configured to calculate a first estimate of the dummy signal and to calculate a representation of the first estimate; wherein the calculating may include applying a second modulo function; wherein the second transmitter may be configured to transmit, over a feedback channel, the representation of the first estimate; wherein the first and second terminals are configured to repeat, for each iteration out of multiple iterations, the steps of: calculating, by the first processor, an estimated error in response to an outcome of a previous iteration and in response to a content of a portion of a message; wherein the calculating may include applying a first modulo function; receiving, by a second receiver, a current received signal; wherein the current received signal represents the estimated error; calculating, by the second processor, and in response to the current received signal, a current estimate of the portion of the message; calculating, by the second processor, a representation of the current estimate; wherein the calculating may include applying the second modulo function; and transmitting, by the second transmitter and over the feedback channel, a representation of the current estimate; wherein the second processor may be configured to estimate the portion of the message, after a completion of the multiple iterations, wherein the estimating of the message is responsive to at least one outcome of at least one iteration.

According to an embodiment of the invention there may be provided a first terminal that may include a first processor, a first receiver and a first transmitter; wherein the transmitter may be configured to transmit over a noisy feedforward channel, a first transmitted signal, thereby allowing the second terminal to receive a first received signal; wherein the first transmitted signal represents a portion of a message; wherein the receiver may be configured to receive a second received signal, wherein the second received signal results from a propagation, over a noisy feedback channel, of a representation of a first estimate of at the least portion of the message; wherein the representation of the first estimate is calculated by the second terminal, wherein the calculation of the representation of the first estimate may include applying a second modulo function; wherein the first terminal us configured to repeat, for each iteration out of multiple iterations, the steps of: calculating, by the first processor, an estimated error, wherein the calculating is responsive to an outcome of a pervious iteration and may include applying a first modulo function; transmitting by the transmitter the estimate error to the second terminal over the noisy feedforward channel; and receiving, by the receiver and over the feedback channel, a representation of the current estimate.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
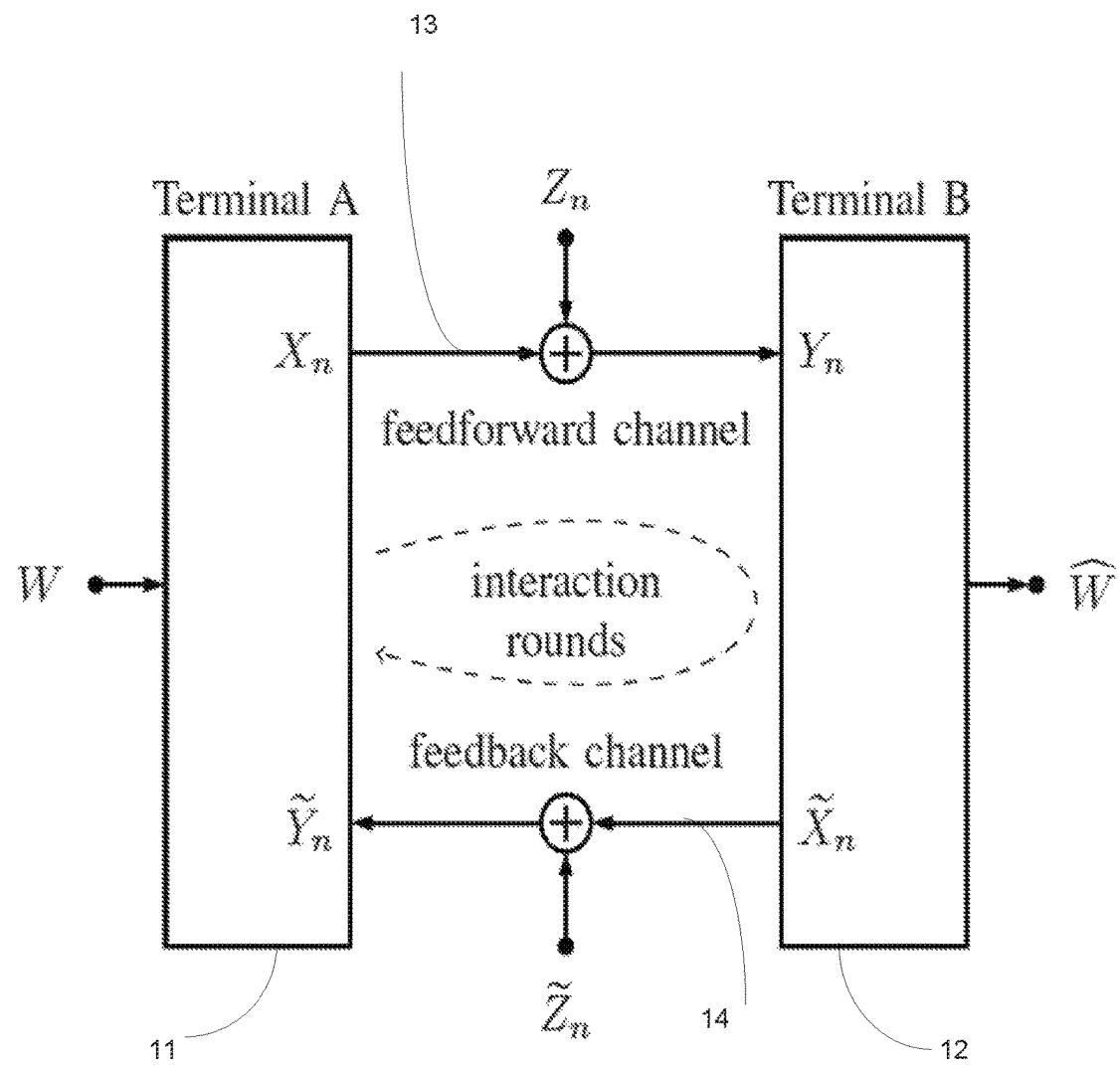
FIG. 1 illustrates prior art first and second terminals.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

According to various embodiments of the invention there are provided systems and method for communicating between terminals. Appendix A and FIGS. 1, 2, 3 and 4 illustrate two terminals according to an embodiment of the invention, a method for transmitting information according to various embodiments of the invention and a mathematical analysis of the suggested methods.

FIG. 1 Illustrates first and second terminals 11 and that are coupled via a noisy feedforward channel 13 and a noisy feedback channel 14.

FIG. 1 illustrates prior art pair of terminals Terminal A 11 and Terminal B 12 and their environment.

The feedforward channel 13 and feedback channel 14 connecting Terminal A to Terminal B and vice versa respectively, are AWGN channels (represented by adders in each one of the channels).

Figure 2:
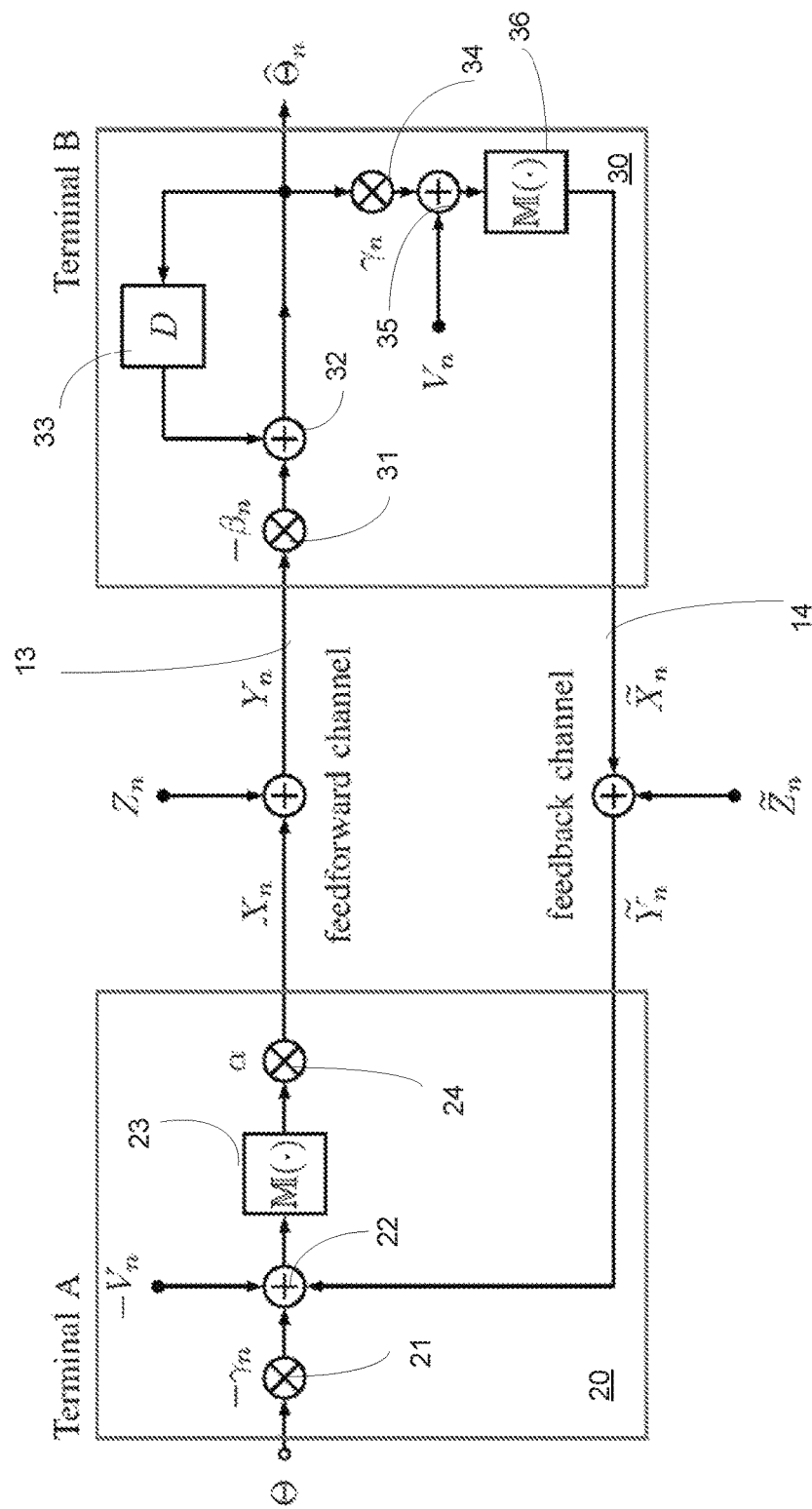
FIG. 2 illustrates first and second terminals according to an embodiment of the invention.

FIG. 2 illustrates first and second terminals 20 and 30 according to an embodiment of the invention.

Especially, FIG. 2 illustrates signals exchanged during various iterations.

In FIG. 2 the feedforward channel is denoted 13 and the feedback channel is denoted 14.

In FIG. 2 the first terminal 20 may receive a signal $\Theta$, scale (21) it by $-\gamma_n$ and sum (22) the scaled signal, dither $-V_n$ and a second receive signal or a representation of the current estimate to provide a sum that undergoes a modulo (24) operation with a fixed interval and is further scaled (25) by $\alpha$ to provide the first transmitted signal $X_n$.

It is noted that at least some of the operations (such as the double scaling and the addition of dither is optional).

For simplicity of explanation FIG. 2 only shows some of the signals. Thus, some of the signals transmitted during the iterations are not shown.

In FIG. 2 the second terminal 30 may receive a received signal $Y_n$, scale (31) it by $-\beta_n$ and sum (22) the received signal with a previous (delayed by delay unit 33) outputted signal ($\hat{\Theta}_n$). The sum is scaled by $\gamma_n$ to provide a scaled signal that is added (35) to dither $V_n$ and to provide a second sum that undergoes a second modulo operation (36) to provide the representation of the current estimate $\hat{X}_n$.

Figure 3:
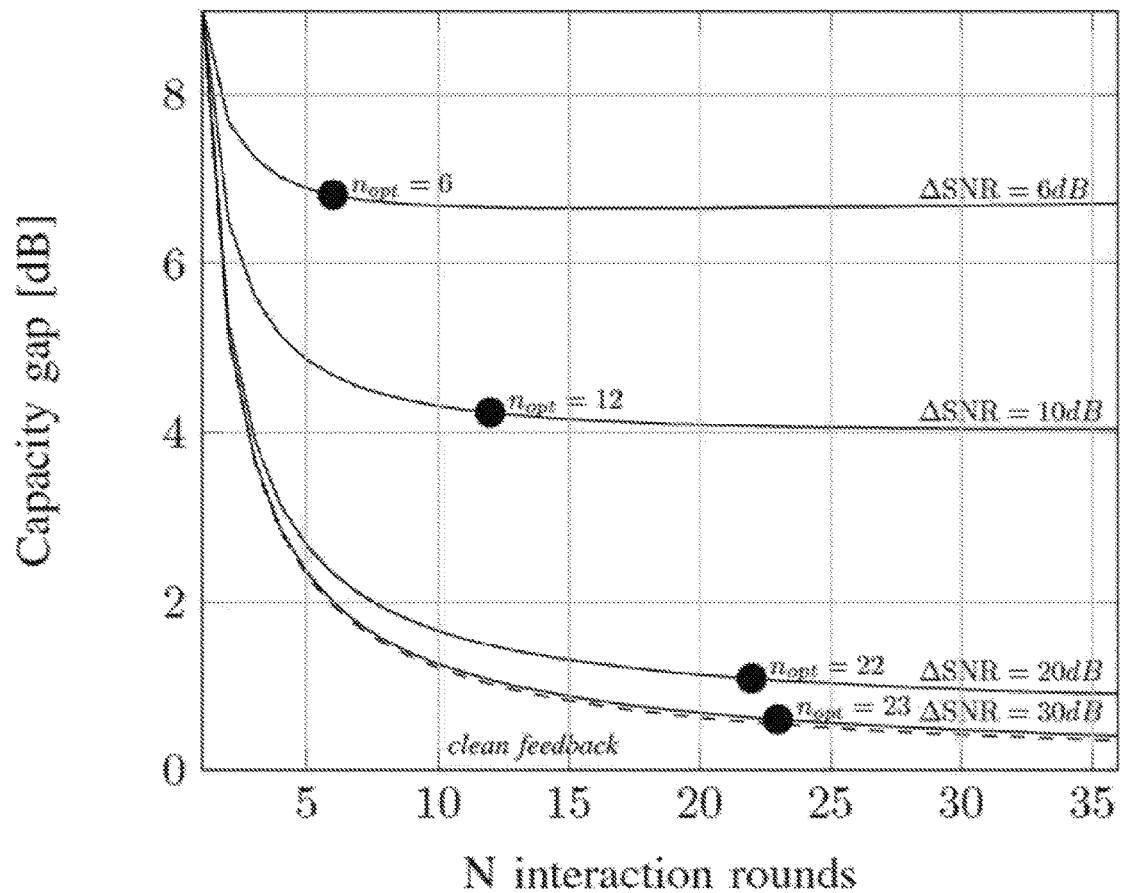
FIG. 3 illustrates a capacity gap in various scenarios that differ from each other by a ratio between the signal to noise ratio (SNR) of the feedback channel and the SNR of the feedforward channel, according to an embodiment of the invention.
Figure 4:
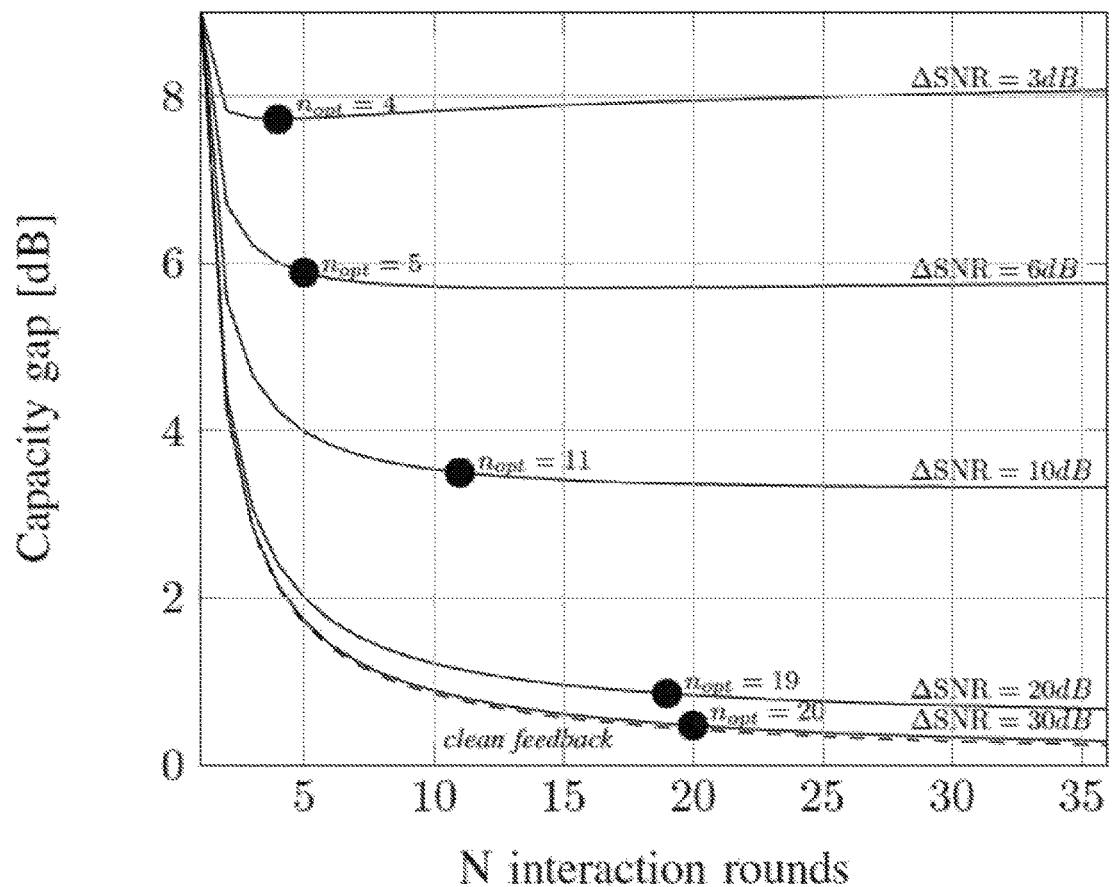
FIG. 4 illustrates a capacity gap in various scenarios that differ from each other by a ratio between the signal to noise ratio (SNR) of the feedback channel and the SNR of the feedforward channel, according to an embodiment of the invention.

Graphs 40 and 50 of FIGS. 3 and 4 illustrate capacity gaps in various scenarios that differ from each other by a ratio between the signal to noise ratio (SNR) of the feedback channel and the SNR of the feedforward channel, according to an embodiment of the invention.

Physical-Layer Security

Our invention admits an inherent physical layer security feature that makes it stochastically impossible for a non-intended user to listen and decode the communicated data. This can be thought of as an interactive encryption process at the analog signal level. Loosely speaking, it is based on the observation that our communication protocol constitutes a stochastic dynamical system that can be stabilized (for the duration of the interaction) by the intended users; anyone else who attempts to accurately track the trajectory of this system (which corresponds to the transmitted data) is doomed to fail since his emulation of the system will become unstable and quickly diverge from the correct trajectory (much like the "butterfly effect" in chaotic systems).

Suppose an eavesdropper/wiretapper (denoted here by Terminal E) listens to signals transmitted to Terminal A and Terminal B, through two noisy channels. Namely $$Y_n^E = X_n + Z_n^E,$$

$$\tilde{Y}_n^E = \tilde{X}_n + \tilde{Z}_n^E$$

where $Z_n^E$ and $\tilde{Z}_n^E$ are noises that are different from (but otherwise arbitrarily correlated to) the noises experienced by Terminal A and Terminal B (namely $Z_n$ and $\tilde{Z}_n$).

The closed loop nature of our transmission scheme implies that in order to decode the message reliably, one must have access to a very clean (virtually noiseless) version of the input signal to Terminal B (i.e., $Y_n$). More precisely, even if Terminal E is able to reconstruct a noisy version of $Y_n$, this estimation noise (however small) will accumulate in the course of the interactive process. This will result in very large error in the estimation of the message point at Terminal E, which in turn can be shown to imply that most of the message bits (the least significant bits of the message point) reconstructed at Terminal E will be virtually statistically independent of the original transmitted bits. Since the most significant bits can still be decoded by Terminal E, they can be set so to dummy bits, i.e. so that they carry no information (random, pseudo random etc.). The number of dummy bits should be determined by the quality of eavesdropper's channels observed at Terminal E. This induces a natural trade-off between communication rate and security. Namely, the better the quality of the eavesdropper's channels, the lower the possible secure communication rate.

There are a couple of different ways (other than dummy bits insertion) of achieving the same goal, as described in the sequel.

The following points are in order:
1. In non-interactive communication (which is the common practice) Terminal E can decode the transmitted message as long as $Z_n^E$ is statistically weaker than $Z_n$ (i.e. with lower or equal variance). In stark contrast, to achieve the same in our interactive system, Terminal E has to be able to learn then sequence $Y_n$ itself, precisely, which is a much harder constraint and typically infeasible.
2. Following the above, it should be emphasized that we can achieve perfect security even when the eavesdropper's channels are much better than the communication channels.
3. Common practice in data security is to employ encryption algorithms that typically work on the digital signal. These algorithms are almost always based on the hardness of some mathematical problem (e.g. prime factorization). Thus, if one has sufficient computational resources, or if one is able to come up with a more efficient algorithm, these encryptions can be broken. In contrast, our system is stochastically secure, in the sense that the data gathered by the eavesdropper is statistically insufficient for reliable decoding, regardless of computational power or algorithmic innovation.
4. It is important to note that in the original invention we had to restrict ourselves to asymmetrical setting, where the feedback channel has a large amount of excess SNR over the feedforward channel. This restriction was imposed in order to make the system more efficient (in terms of power, rate, delay, complexity) relative to common practice, which was the original motivation of the invention. In cases where the goal is secure transmission (and not efficient transmission) our system can operate in any SNR regime, symmetric or asymmetric. The quality of the feedback channel will in general determine the cost in rate required to achieve security. It should be emphasized that in the original asymmetrical setting, there is no such loss in rate (apart from the dummy bits).

Dummy Bits Assignment

The number of dummy bits is essentially determined by the variance $\sigma^2$ of the MMSE estimator of $Y_n$ from the pair $Y_n^E, \tilde{Y}_n^E$, which can be computed. The larger $\sigma^2$, the smaller the number of dummy bits required, and the smaller the rate penalty incurred. When decoding, Terminal E will be able to reconstruct the message point within some large variance that does not decay exponentially (just like in noisy feedback systems that do not use our modulo method). The larger $\sigma^2$ the larger this variance, hence the less resolution obtainable by Terminal E. When increasing the number of iterations N, Terminal B can decode more bits (as its reconstruction resolution decays exponentially), but Terminal E gets "stuck", hence the rate penalty diminishes. Of course, N cannot grow very large due to modulo errors. But for secure transmission, we would like to set it to be as large as possible without jeopardizing reliability at Terminal B. Once the number of dummy bits is determined, they are randomly selected and constitute the MSB's of the message point. Note that the labeling of the constellation should be chosen such that large deviations would correspond to MSB's.

According to an embodiment of the invention the transmission scheme include reduce the power of the constellation such that in the first transmissions the first terminal transmits dummy bits such as information that is below the noise level of the noisy feedthrough channel. The power reduction again corresponds to the estimation variance $\sigma^2$. In this case, Terminal A effectively transmits just modulo-filtered noise during the first few iterations, and only then starts to incorporate the actual message. In these first few iterations, Terminal A and B remain synchronized, yet Terminal E becomes "decorrelated" from them and can no longer reliably follow the conversation. These first few iterations can be thought of as our interactive analogue of a cryptographic key exchange. As before, the rate penalty incurred for secrecy is inversely related to both $\sigma^2$ (which determines the number of "key exchange" rounds) and the number of iterations N. Note that other variations on this method are possible, playing with the transmission power.

According to another embodiment of the invention the first terminal applies a masking function (known to the first and second terminals) on the message in the and the second terminal applies an known unmasking function on the decoded information.

A non-limiting example of a masking function is a sum with a known message. A message that is generated in a known manner W' is the known message and W is the data. W' is known to both Terminal A and B (say pseudo-randomly generated) and W is the actual message. Map both to (say) PAM constellation points Θ', Θ of suitable rates, and use our interactive communication system to transmit Θ'+Θ (or some other suitable linear combination). The number of bits for W' and the associated power allocated to Θ' are determined by the aforementioned estimation variance $\sigma^2$ at Terminal A. Terminal E will be able to decode only Θ' that does not contain any information, while Terminal B will be able to remove Θ' and reliably decode Θ as desired. Again, increasing the number of iterations N (up to a limit dictated by the modulo-aliasing errors) will increase the part played by the actual message W, and will render the rate loss smaller. This method may be favored over Method 1 when there is system constraint requiring transmission at a constant power at all times.

Figure 5:
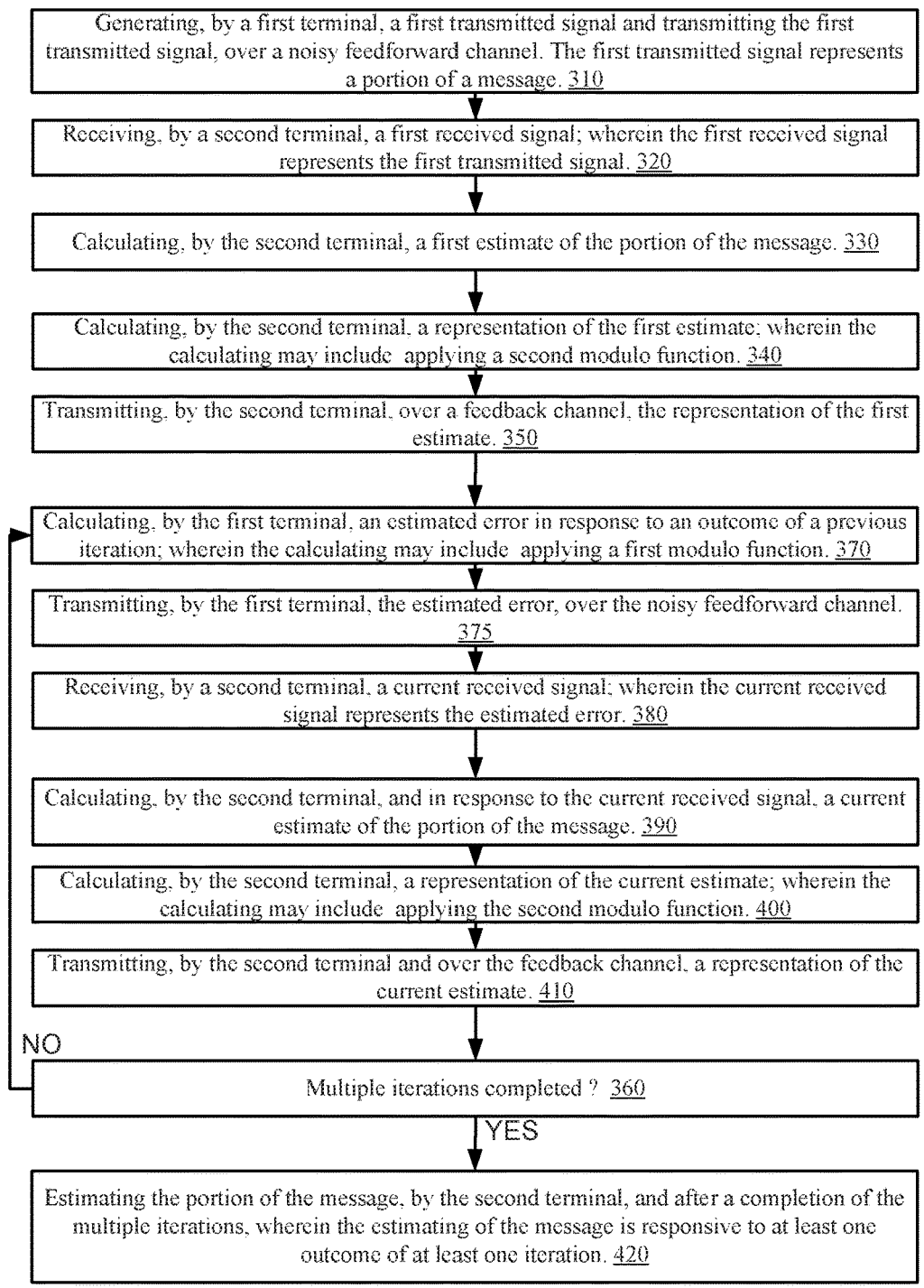
FIG. 5 illustrates first and second terminals according to an embodiment of the invention.
Figure 6:
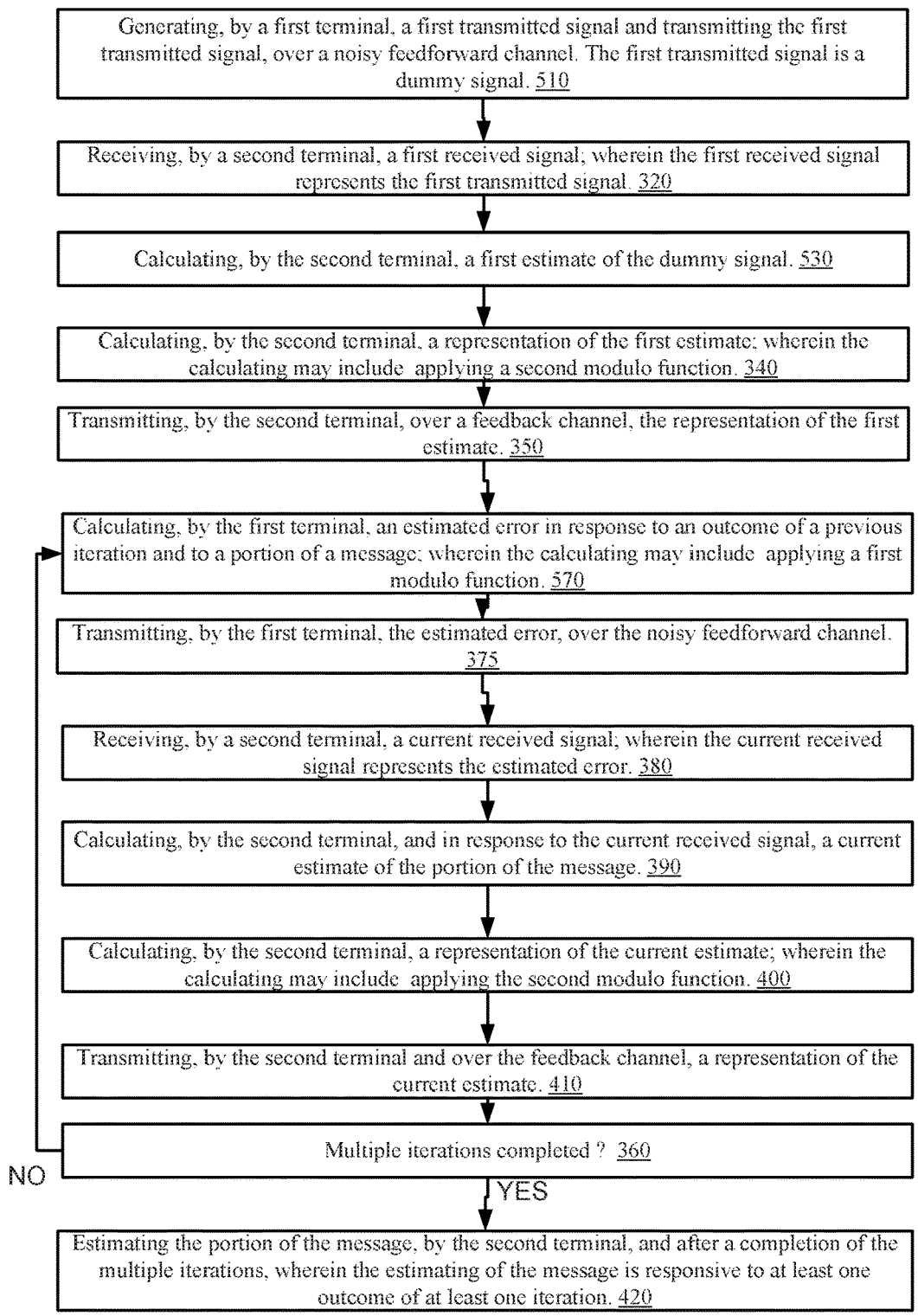
FIG. 6 illustrates a method according to an embodiment of the invention.
Figure 7:
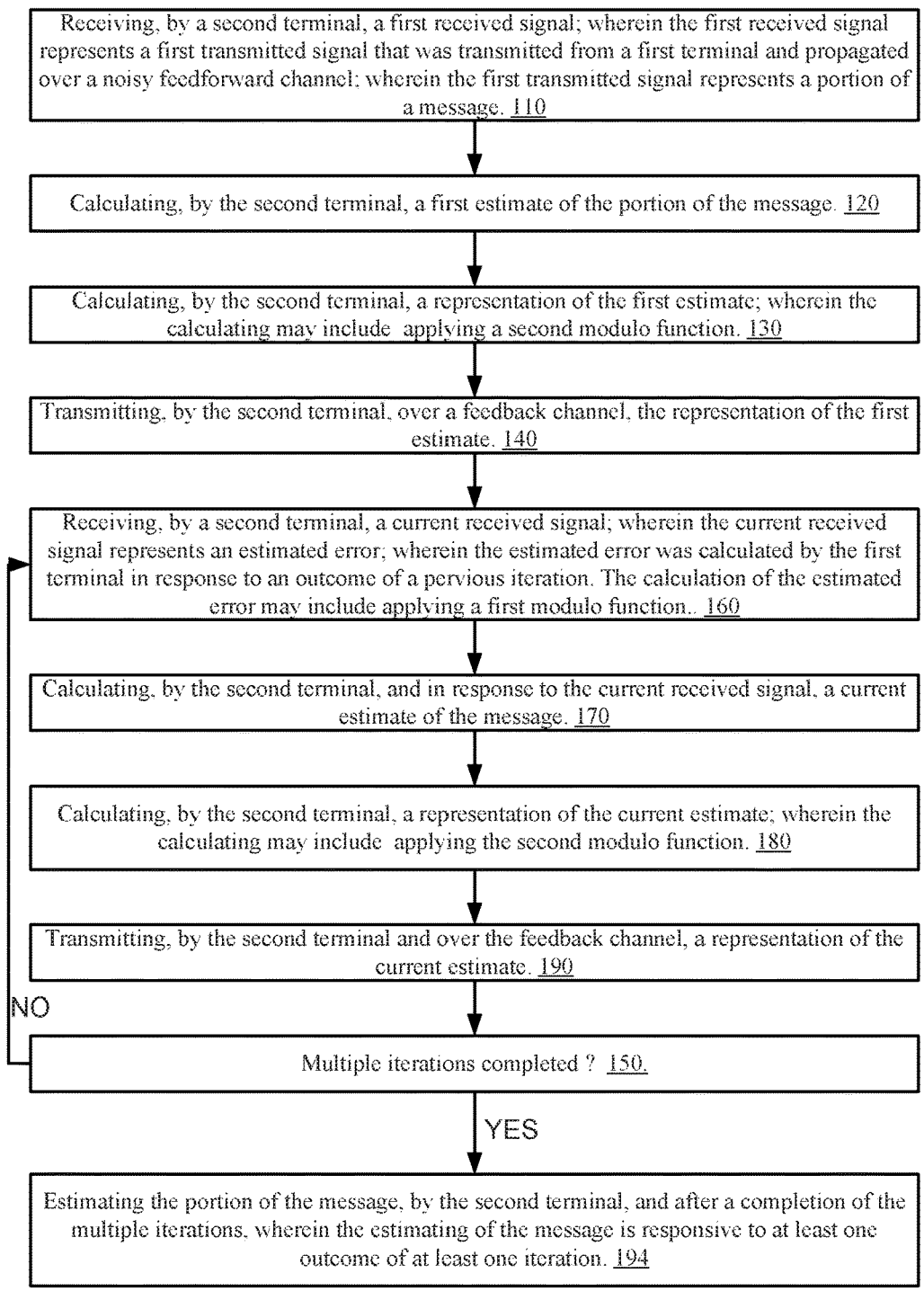
FIG. 7 illustrates a method according to an embodiment of the invention.
Figure 8:
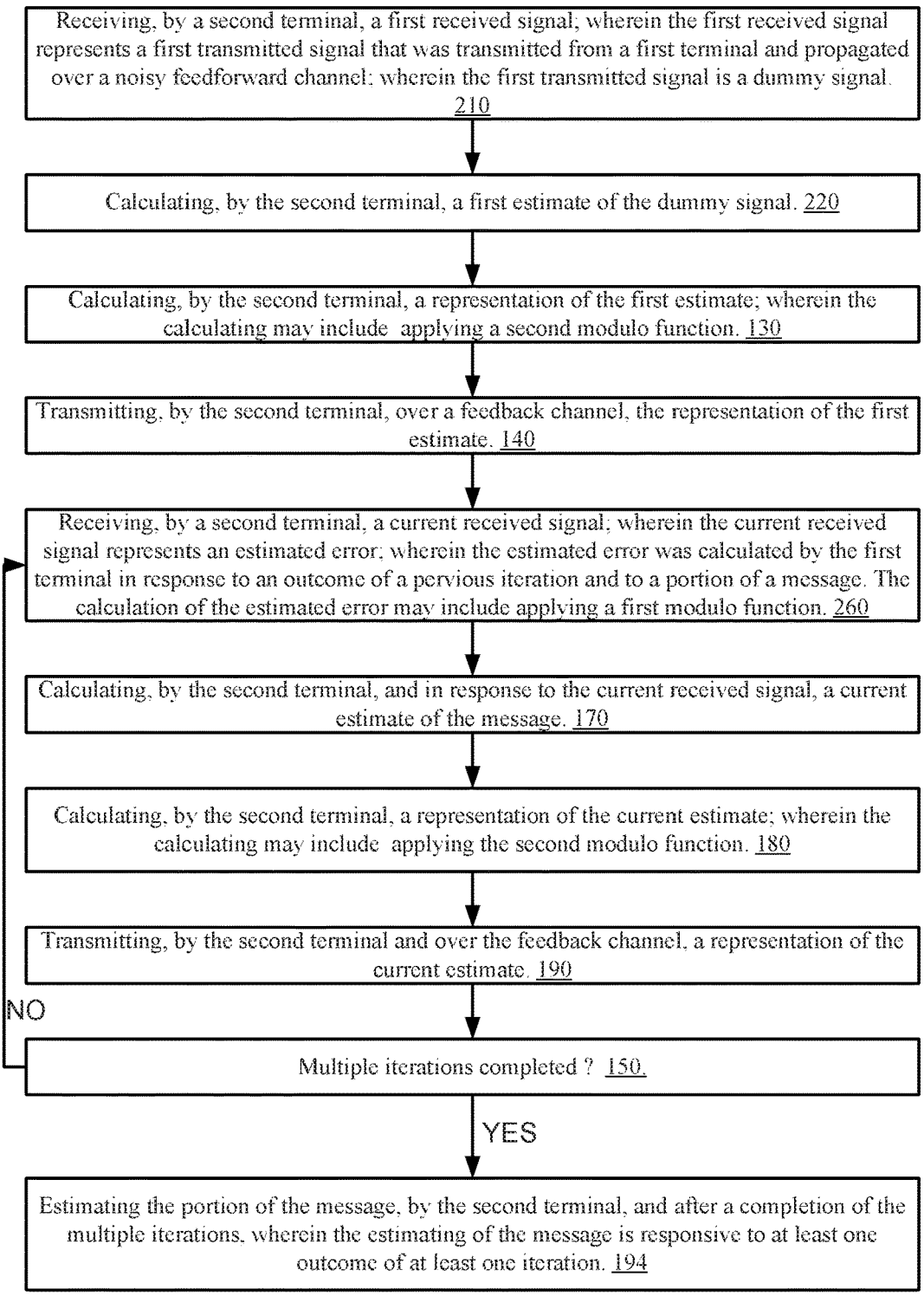
FIG. 8 illustrates a method according to an embodiment of the invention.
Figure 9:
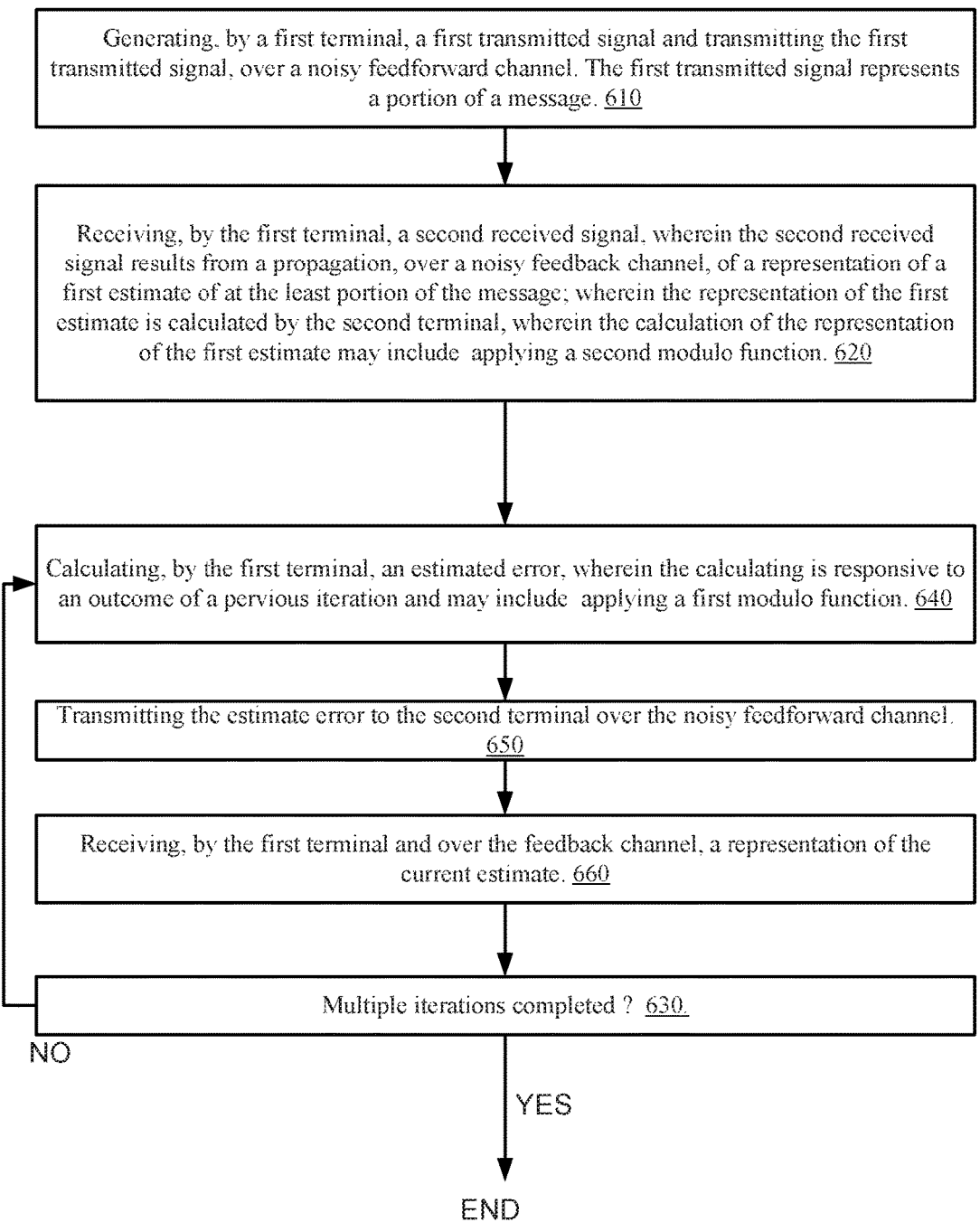
FIG. 9 illustrates a method according to an embodiment of the invention.
Figure 10:
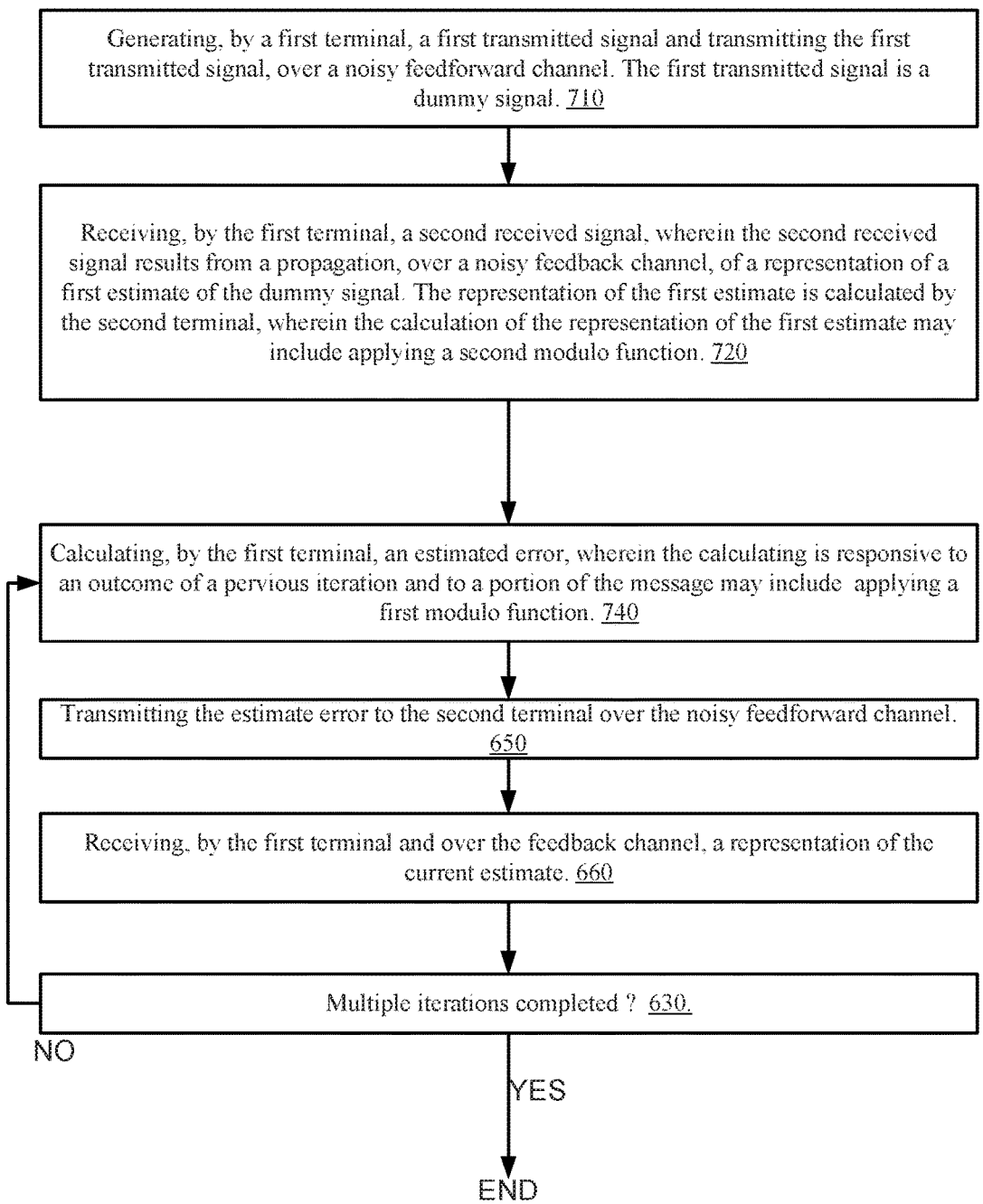
FIG. 10 illustrates a method according to an embodiment of the invention.

FIGS. 5 and 6 illustrate a method that is executed by both the first terminal and the second terminal FIGS. 7 and 8 illustrate the steps executed by the second terminal FIGS. 9 and 10 illustrate the steps executed by the first terminal.

FIGS. 5, 7 and 9 refer to a scenario in which the first transmitted signal represents a portion of the message. FIGS. 6, 8 and 10 refer to a scenario in which the first transmitted signal is a dummy signal.

FIG. 5 illustrates method 300 according to an embodiment of the invention.

Method 300 includes an initialization sequence of steps 310, 320, 330, 340 and 350. This initialization sequence of steps is followed by multiple iterations (predetermined number of iterations, monitored by step 360) of steps 370, 375, 380, 390, 400, and 410. Method 300 ends by step 420.

Step 310 may include transmitting a transmitted signal, by a first terminal and over a noisy feedforward channel; wherein the first transmitted signal represents a portion of a message.

Step 320 may include receiving, by a second terminal, a first received signal; wherein the first received signal represents the first transmitted signal.

Step 330 may include calculating, by the second terminal, a first estimate of the portion of the message.

Step 340 may include calculating, by the second terminal, a representation of the first estimate; wherein the calculating may include applying a second modulo function.

Step 350 may include transmitting, by the second terminal, over a feedback channel, the representation of the first estimate.

Step 370 may include calculating, by the first terminal, an estimated error in response to an outcome of a previous iteration; wherein the calculating may include applying a first modulo function.

Step 375 may include transmitting the estimate error to the second terminal over the noisy feedforward channel.

Step 380 may include receiving, by a second terminal, a current received signal; wherein the current received signal represents the estimated error.

Step 390 may include calculating, by the second terminal, and in response to the current received signal, a current estimate of the portion of the message.

Step 400 may include calculating, by the second terminal, a representation of the current estimate; wherein the calculating may include applying the second modulo function.

Step 410 may include Transmitting, by the second terminal and over the feedback channel, a representation of the current estimate.

Step 340 may include estimating the portion of the message, by the second terminal, and after a completion of the multiple iterations, wherein the estimating of the message is responsive to at least one outcome of at least one iteration of the multiple iterations.

The first transmitted signal may be modulated by any modulation scheme, such as but not limited to pulse amplitude modulation, quadrature amplitude modulation, pulse position modulation, phase shift keying modulation or continuous phase modulation.

The calculating of each representation of the current estimate may include calculating a scaled version of the current estimate modulo a fixed interval.

The calculating of a scaled version of the current estimate modulo the fixed interval may be responsive to power constraints. For example—a maximal power consumption, an allowed power change, and the like.

The calculating of each representation of the current estimate may include calculating a sum of a dither signal and the current estimate and applying the second modulo operation on the sum.

The estimating of the portion of the message may include applying an unmasking function, the unmasking function reverses a masking function applied by the first terminal on the portion of the message.

The applying of the unmasking function may include subtracting a known content.

The applying of the unmasking function may include subtracting a content that is generated by a predefined process known to the first and second terminals.

The calculating of each estimate error, by the first terminal, may include calculating a sum of a dither signal and the outcome of the pervious iteration and applying the first modulo operation on the sum.

FIG. 6 illustrates method 500 according to an embodiment of the invention.

Method 500 includes an initialization sequence of steps 510, 320, 530, 340 and 350. This initialization sequence of steps is followed by multiple iterations (predetermined number of iterations, monitored by step 360) of steps 570, 375, 380, 390, 400, and 410. Method 300 ends by step 420.

As indicated above, method 500 differs from method 300 by replacing steps 310, 330 and 370 by steps 510, 550 and 570, respectively.

Step 510 may include transmitting a transmitted signal, by a first terminal and over a noisy feedforward channel; wherein the first transmitted signal is a dummy signal.

The dummy signal may have a content of the portion of the message and an intensity that does not exceed a noise level of the feedforward channel.

The dummy signal may have a content that is set regardless of a content of the portion of the message.

Step 550 may include calculating, by the second terminal, a first estimate of the dummy signal.

Step 570 may include calculating, by the first terminal, an estimated error in response to an outcome of a previous iteration and in response to a content of a portion of a message; wherein the calculating may include applying a first modulo function. Because the first terminal calculates the error estimate, at least partially based on the portion of the message (that was not properly transmitted to the second terminal), the second terminal eventually is able to reconstruct the portion of the message. During the first iteration the first terminal may calculate an error between the first estimate of the dummy signal and during further iterations the first terminal may calculate the error between the outcome of the previous iteration and the portion of the message.

FIG. 7 illustrates method 100 according to an embodiment of the invention.

Method 100 includes an initialization sequence of steps 110, 120, 130 and 140. This initialization sequence of steps is followed by multiple iterations (predetermined number of iterations, monitored by step 150) of steps 160, 170, 180 and 190. Method 100 ends by step 194.

Step 110 may include receiving, by a second terminal, a first received signal; wherein the first received signal represents a first transmitted signal that was transmitted from a first terminal and propagated over a noisy feedforward channel; wherein the first transmitted signal represents a portion of a message.

Step 120 may include calculating, by the second terminal, a first estimate of the portion of the message.

Step 130 may include calculating, by the second terminal, a representation of the first estimate; wherein the calculating may include applying a second modulo function.

Step 140 may include Transmitting, by the second terminal, over a feedback channel, the representation of the first estimate.

Step 160 may include receiving, by a second terminal, a current received signal; wherein the current received signal represents an estimated error; wherein the estimated error was calculated by the first terminal in response to an outcome of a pervious iteration and may include applying a first modulo function.

Step 170 may include Calculating, by the second terminal, and in response to the current received signal, a current estimate of the message.

Step 180 may include calculating, by the second terminal, a representation of the current estimate; wherein the calculating may include applying the second modulo function.

Step 190 may include transmitting, by the second terminal and over the feedback channel, a representation of the current estimate.

Step 194 may include estimating the portion of the message, by the second terminal, and after a completion of the multiple iterations, wherein the estimating of the message is responsive to at least one outcome of at least one iteration.

FIG. 8 illustrates method 200 according to an embodiment of the invention.

Method 200 includes an initialization sequence of steps 210, 220, 130 and 140. This initialization sequence of steps is followed by multiple iterations (predetermined number of iterations, monitored by step 150) of steps 260, 170, 180 and 190. Method 200 ends by step 194.

As indicated above, method 200 differs from method 100 by replacing steps 110, 120 and 260 by steps 210, 220 and 260, respectively.

Step 210 may include receiving, by a second terminal, a first received signal; wherein the first received signal represents a first transmitted signal that was transmitted from a first terminal and propagated over a noisy feedforward channel; wherein the first transmitted signal is a dummy signal.

Step 220 may include calculating, by the second terminal, a first estimate of the dummy signal.

Step 260 may include receiving, by a second terminal, a current received signal; wherein the current received signal represents an estimated error; wherein the estimated error was calculated by the first terminal in response to an outcome of a pervious iteration and in response to a portion of a message and may include applying a first modulo function.

FIG. 9 illustrates method 600 according to an embodiment of the invention.

Method 600 includes an initialization sequence of steps 610 and 620. This initialization sequence of steps is followed by multiple iterations (predetermined number of iterations, monitored by step 630) of steps 640, 650 and 660.

Step 610 may include transmitting, by a first terminal and over a noisy feedforward channel, a first transmitted signal, thereby allowing the second terminal to receive a first received signal; wherein the first transmitted signal represents a portion of a message.

Step 620 may include receiving, by the first terminal, a second received signal, wherein the second received signal results from a propagation, over a noisy feedback channel, of a representation of a first estimate of at the least portion of the message; wherein the representation of the first estimate is calculated by the second terminal, wherein the calculation of the representation of the first estimate may include applying a second modulo function.

Step 640 may include calculating, by the first terminal, an estimated error, wherein the calculating is responsive to an outcome of a pervious iteration and may include applying a first modulo function.

Step 650 may include transmitting the estimate error to the second terminal over the noisy feedforward channel.

Step 660 may include receiving, by the first terminal and over the feedback channel, a representation of the current estimate.

FIG. 10 illustrates method 700 according to an embodiment of the invention.

Method 700 includes an initialization sequence of steps 710 and 720. This initialization sequence of steps is followed by multiple iterations (predetermined number of iterations, monitored by step 630) of steps 740, 650 and 660.

Method 700 differs from method 600 by replacing steps 610, 620 and 640 by steps 710, 720 and 740.

Step 710 may include transmitting, by a first terminal and over a noisy feedforward channel, a first transmitted signal, thereby allowing the second terminal to receive a first received signal. The first transmitted signal is a dummy signal.

Step 720 may include receiving, by the first terminal, a second received signal, wherein the second received signal results from a propagation, over a noisy feedback channel, of a representation of a first estimate of the dummy signal. The representation of the first estimate is calculated by the second terminal, wherein the calculation of the representation of the first estimate may include applying a second modulo function.

Step 740 may include calculating, by the first terminal, an estimated error, wherein the calculating is responsive to an outcome of a pervious iteration and to a portion of the message may include applying a first modulo function.

Any combination of any steps of any methods can be provided.

There is provided a first terminal that is configured to execute any combination of any method stages that were mentioned above as executed by the first terminal See, for example FIGS. 9 and 10, steps 310, 370, 375 and 360 of FIG. 5 and steps 360, 375, 510 and 570 of FIG. 6.

There is provided a second terminal that is configured to execute any combination of any method stages that were mentioned above as executed by the second terminal See, for example FIGS. 7 and 8, steps 320, 330, 340, 350, 380, 390, 400 and 410 of FIG. 5 and steps 320, 530, 340, 350, 380, 390, 400 and 410 of FIG. 6.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

APPENDIX A

1 Introduction

Feedback cannot improve the capacity of point-to-point memoryless channels [1]. Nevertheless, noiseless feedback can significantly simplify the transmission schemes and improve the error probability performance, see e.g. [2-5]. These elegant schemes fail however in the presence of arbitrarily small feedback noise, rendering them grossly impractical. This fact has been initially observed in [3] for the Additive White Gaussian Noise (AWGN) channel, and further strengthened in [6]. A handful of works have tackled the problem of noisy feedback as means for improving error performance, see e.g. [7-10]. However, these works attain their superior error performance at the cost of a significant increase in complexity w.r.t. their noiseless feedback counterparts. There appears to be no simple scheme (in the spirit of [3-5]) that is robust to feedback noise known hitherto.

Our work is therefore motivated by the following question: Does the simplicity of the infeasible noiseless feedback schemes extend itself to the more realistic noisy feedback setup, while still offering near-optimal performance? While the answer to this question appears to be negative if one insists on approaching capacity in the usual sense (vanishing error probability in the limit of large delay), we answer it here in the affirmative under a fixed (but small) error probability criterion. Specifically, we consider the following setup: Two Terminals A and B are connected by pair of independent AWGN channels, and are limited by individual power constraints. The channel from Terminal A (resp. B) to Terminal B (resp. A) is referred to as the feedforward (resp. feedback) channel. Terminal A wishes to send bits to Terminal B, within a given bit error probability. The figure-of-merit we look at is the capacity gap, which is the amount of excess SNR required by our scheme over the minimal possible SNR for an optimal Shannon scheme (of unbounded complexity), achieving the same bit rate and bit error probability. For this setup, we introduce and analyze a simple interactive scheme, that can operate near capacity. Our construction is based on the Schalkwijk-Kailath (S-K) noiseless feedback scheme [3] with active feedback, endowed with modulo arithmetic. Loosely speaking, our scheme is founded on the following observations:

(1) The capacity gap (in dB) attained by the S-K scheme (for noiseless feedback) is inversely proportional to the number of iterations, and hence capacity is approached in a small number of rounds.

(2) The S-K scheme can be described as follows. Terminal A encodes and sends its message via Pulse Amplitude Modulation (PAM), and in subsequent rounds, sends a scaled version of the estimation error of Terminal B (which is computable due to noiseless feedback), thereby exponentially decreasing the variance of the total estimation error. This scheme can operate using only passive feedback. Alternatively, Terminal B could clearly employ active feedback by transmitting its current estimate of the message, rather then its observations. This simple tweak is meaningless in the noiseless feedback case, yet turns out to be essential when feedback is noisy.

(3) Suppose the S-K scheme is used when noise is present in the feedback channel. In each round, Terminal B knows the sum of the estimation error and the PAM message, whereas Terminal A knows the PAM message only. Describing the estimation error to Terminal A over the feedback channel is therefore a joint source-channel coding problem with side information at the receiver. Exploiting the side information could potentially yield a markedly better description of the estimation error. One simple way to reap this gain is by employing modulo arithmetic in the spirit of Tomlinson-Harashmia precoding [11, 12].

(4) Following the above joint source-channel coding procedure, the estimation error of Terminal B becomes known at Terminal A, up to some excess additive noise induced by the noisy feedback. Due to the modulo-linearity of the operations, this excess noise can be effectively pushed into the forward channel.

In a nutshell, our scheme operates as follows. Terminal A encodes and sends its message using PAM. In subsequent rounds, Terminal B computes its best linear estimate of the message, and feeds back a scaled version of that estimate, modulo a fixed interval. In turn, Terminal A employs a suitable modulo computation and obtains the estimation error, corrupted by excess additive noise. This quantity is then properly scaled and sent over the feedforward channel to Terminal B. After a fixed number of rounds, Terminal B decodes the message via a simple minimum distance rule. Loosely speaking, the scheme's error probability is dictated by the events of a modulo aliasing in one of the rounds, and the event where the remaining estimation noise in the last round exceeds half the minimum distance of the PAM constellation. The maximal number of rounds is limited by the need to control the modulo-aliasing errors.

The resulting capacity gap (Theorem 1) consists of four terms: 1) An "S-K term" that is inversely proportional to the number of rounds; 2) A "concatenated channel" term, that corresponds to the decrease in SNR incurred by trivially concatenating the forward and feedback channels, and is (roughly) inversely proportional to the excess SNR of the feedback channel over the feedforward channel; 3) a "modulo-aliasing" term that stems from the error floor imposed by employing the modulo operation, and is (roughly) inversely proportional to the SNR of the feedback channel; and 4) An auxiliary term that is (roughly) inversely proportional to the SNR of the feedforward channel.

As an example, for a bit error probability of $10^{-6}$, if the SNR of the feedback channel exceeds the SNR of the feedforward channel by 20 dB (resp. 10 dB), our scheme operates at a capacity gap of 0.8 dB (resp. 3.5 dB), with only 19 (resp. 11) rounds of interaction. This should be juxtaposed against two reference systems: On the one hand, state-of-the-art FEC codes attaining the same capacity gap and error probability, require roughly a two orders-of-magnitude increase in delay and complexity. On the other hand, the capacity gap attained by a minimal delay uncoded system with the same error probability, is at least 9 dB.

The rest of the paper is organized as follows. The problem setup is introduced in Section 2. Necessary background including the capacity gap of uncoded PAM and an active feedback representation of the S-K scheme are given in Section 3. Our new scheme is described in Section 4, and its performance is discussed in Section 5. A detailed analysis of the scheme is provided in Section 6. Some numerical results and figures are given in Section 7. Implementation issues and the applicability of our scheme to real world scenarios are treated In Section 8. A discussion of the results and their context appears in Section 9.

2 Setup

In the sequel, we use the following notations. For any number x>0, we write $x_{dB} \stackrel{\text{def}}{=} 10\log_{10}(x)$ to denote the value of x in decibels. The Gaussian Q-function is $$Q(x) \stackrel{\text{def}}{=} (2\pi)^{-\frac{1}{2}} \int_x^\infty \exp(-u^2/2)du,$$

and $Q^{-1}(\bullet)$ its functional inverse. We use the vector notation $x^n \stackrel{\text{def}}{=} (x_1, \ldots, x_n)$. We write $f(x)=O(g(x))$ for $\limsup_{x\to\infty}|f(x)/g(x)|<\infty$.

Our problem setup is depicted in FIG. 1. The feedforward and feedback channels connecting Terminal A to Terminal B and vice versa respectively, are AWGN channels given by $$Y_n = X_n + Z_n,$$

$$\tilde{Y}_n = \tilde{X}_n + \tilde{Z}_n.$$

Where $X_n, Y_n$ (resp. $\tilde{X}_n, \tilde{Y}_n$) are the input and output of the feedforward (resp. feedback) channel at time n respectively. The feedforward (resp. feedback) channel noise $Z_n \sim \mathcal{N}(0, \sigma^2)$ (resp. $\tilde{Z}_n \sim \mathcal{N}(0, \tilde{\sigma}^2)$) is independent of the input $X_n$ (resp. $\tilde{X}_n$), and constitutes an i.i.d. sequence. The feedforward and feedback noise processes are mutually independent.

Terminal A is in possession of a message W~Uniform ([M]), to be described to Terminal B over N rounds of communication. To that end, the terminals can employ an interactive scheme defined by a pair of functions ($\varphi, \tilde{\varphi}$) as follows: At time n, Terminal A sends a function of its message W and possibly of past feedback channel outputs over the feedforward channel, i.e., $$X_n = \varphi(W, \tilde{Y}^{n-1}).$$

Similarly, Terminal B sends function of its past observations to Terminal A over the feedback channel, i.e., $$\tilde{X}_n = \tilde{\varphi}(Y^n).$$

Remark 1. The dependence of $\varphi$ and $\tilde{\varphi}$ on n is suppressed. In general, we allow these functions to further depend on common randomness shared by the terminals. A general interactive scheme can therefore be very complex; however, in what follows we will present and discuss a scheme that is very simple. We note in passing that our definition of the feedback transmission scheme is sometimes referred to as active feedback; the term passive feedback is usually reserved to the special case where $\tilde{\varphi}(Y^n)=Y_n$.

We assume that Terminal A (resp. Terminal B) is subject to a power constraint P (resp. $\tilde{P}$), namely $$\sum_{n=1}^N \mathbb{E}(X_n^2) \leq N \cdot P, \sum_{n=1}^N \mathbb{E}(\tilde{X}_n^2) \leq N \cdot \tilde{P}.$$

We denote the feedforward (resp. feedback) SNR by SNR $$SNR \stackrel{\text{def}}{=} \frac{P}{\sigma^2}\left(resp.\ S\tilde{N}R \stackrel{\text{def}}{=} \frac{\tilde{P}}{\tilde{\sigma}^2}\right).$$

The ratio between the feedback SNR and the feedforward SNR is denoted by $$\Delta SNR \stackrel{\text{def}}{=} \frac{S\tilde{N}R}{SNR}.$$

Throughout this work, we assume that the feedback channel has excess SNR over the feedforward channel, i.e. $\Delta SNR>1$.

An interactive scheme ($\varphi, \tilde{\varphi}$) is associated with a rate $$R \stackrel{\text{def}}{=} \frac{\log M}{N}$$

and an error probability $p_e$, which is the probability that Terminal B errs in decoding the message W at time N, under the optimal decision rule.

The capacity gap $\Gamma$ attained by the scheme is defined as follows. Recall that the Shannon capacity of the AWGN implies that the maximal rate achievable by any scheme (of unbounded complexity/delay, with or without feedback) under vanishing error probability, is given by $$C = \frac{1}{2}\log(1 + SNR). \tag{1}$$

Conversely, the minimal SNR required to attain a rate R is $2^{2R}-1$. The capacity gap is the excess SNR required by the scheme, i.e., $$\Gamma(\varphi, \tilde{\varphi}) = \Gamma \stackrel{\text{def}}{=} \frac{SNR}{2^{2R}-1}. \tag{2}$$

Note that if a nonzero bit/symbol error probability is allowed, then one can achieves rates exceeding the Shannon capacity (1), and this effect should in principle be accounted for, to make the definition of the capacity gap fair. However, for small error probabilities the associated correction factor (given by the inverse of the corresponding rate distortion function) becomes negligible, and we therefore ignore it in the sequel.

3 Preliminaries

In this section, we describe the three building blocks underlying our interactive scheme. First, we discuss the performance of uncoded PAM transmission, and the associated capacity gap. We then describe the S-K scheme with active (noiseless) feedback, and derive the associated decay of the capacity gap as a function of the number of interaction rounds. Lastly, we briefly discuss the notations and properties of modulo arithmetic to be used in our scheme.

3.1 Uncoded PAM

PAM is a simple and commonly used modulation scheme, where $2^R$ symbols are mapped (one-to-one) to the set $$\{\pm 1\eta, \pm 3\eta, \ldots, \pm(2^R-1)\eta\}.$$

Canonically, the normalization factor $\eta$ is set so that the overall mean square of the constellation (assuming equiprobable symbols) is unity. A straightforward calculation yields $\eta=\sqrt{3/(2^{2R}-1)}$. In the general case where the mean square of the constellation is constrained to be P, $\eta$ is replaced with $\eta\sqrt{P}$.

It is easy to show that for an AWGN channel with zero mean noise of variance $\sigma^2$ and average input power constraint P, the probability of error incurred by the optimal detector is bounded by the probability that the noise exceed half the minimal distance of the PAM constellation, i.e., $$p_e < 2Q\left(\frac{\sqrt{P}\eta}{\sigma}\right) = 2Q\left(\sqrt{\frac{3SNR}{2^{2R}-1}}\right). \quad (3)$$

Fixing the error probability $p_e$ and solving the inequality (3) for R yields:

$$R > \frac{1}{2}\log\left(1+\frac{SNR}{\Gamma}\right), \quad (4)$$

where $$\Gamma_0(p_e) \stackrel{def}{=} \frac{1}{3}\left[Q^{-1}\left(\frac{p_e}{2}\right)\right]^2. \quad (5)$$

Comparing (4) and (1), we see that PAM signaling with error probability $p_e$ admits a capacity gap of $\Gamma_0(p_e)$. For a typical value of $p_e=10^{-6}$, the capacity gap of uncoded PAM is $\Gamma_{0,dB}=9$ dB.

Finally, we assume as usual that bits are mapped to PAM constellation symbols via Cray labeling. The associated bit error probability can thus be bounded by $$p_b < \frac{2}{R}Q\left(\frac{\sqrt{P}\eta}{\sigma}\right) + 2Q\left(3\frac{\sqrt{P}\eta}{\sigma}\right) \approx \frac{p_e}{R}. \quad (6)$$

where the approximation is becomes tight for small $p_e$ due to the strong decay of the Q-function.

3.2 The S-K Scheme with Active Feedback

Consider the setting of communication over the AWGN with noiseless feedback, i.e., where $\tilde{\sigma}^2=0$. The S-K scheme with active feedback is described as follows. First, Terminal A maps the message W to a PAM constellation point $\Theta$. In the first round, it sends a scaled version of $\Theta$ satisfying the power constraint P. In subsequent rounds, Terminal B maintains an estimate $\hat{\Theta}_n$ of $\Theta$ given all the observation it has, and feeds it back to Terminal A. Terminal A then computes the estimation error $\varepsilon_n \stackrel{def}{=} \hat{\Theta}_n-\Theta$, and sends a properly scaled version of it to Terminal B. Formally:

(A) Initialization:
Terminal A: Map the message W to a PAM point $\Theta$.
Terminal A $\Rightarrow$ Terminal B:
Send $X_1=\sqrt{P}\Theta$
Receive $Y_1=X_1+Z_1$
Terminal B: Initialize the $\Theta$ estimate[1] to $$\hat{\Theta}_1 = \frac{Y_1}{\sqrt{P}}.$$

(B) Iteration:

[1] Note that this is the minimum variance unbiased estimate of $\Theta$.

Terminal B $\Rightarrow$ Terminal A:
Send the current $\Theta$ estimate: $\tilde{X}_n=\hat{\Theta}_n$
Receive $\tilde{Y}_n=\tilde{X}_n$
Terminal A: Compute the estimation error $\varepsilon_n=\tilde{Y}_n-\Theta$.
Terminal A $\Rightarrow$ Terminal B:
Send the scaled estimation error $X_{n+1}=\alpha_n\varepsilon_n$, where $$\alpha_n = \frac{\sqrt{P}}{\sigma_n}$$

so that the input power constraint holds, and where $\sigma_n^2 \stackrel{def}{=} \mathbb{E}\varepsilon_n^2$.

Receive $Y_n=X_n+Z_n$
Terminal B: Update the $\Theta$ estimate[1] $\hat{\Theta}_{n+1}=\hat{\Theta}_n-\hat{\varepsilon}_n$, where $$\hat{\varepsilon}_n=\beta_{n+1}Y_{n+1}$$

is the Minimum Mean Square Error (MMSE) estimate of $\varepsilon_n$, thus $$\beta_{n+1} = \frac{\sqrt{P\sigma_n^2}}{P+\sigma^2} = \frac{\sigma_n}{\sigma} \cdot \frac{\sqrt{SNR}}{1+SNR}.$$

(C) Decoding:

At time N the receiver decodes the message using a minimum distance decoder for $\hat{\Theta}_N$ w.r.t. the PAM constellation.

To calculate the error probability and rate attained by the S-K scheme, we note that $\varepsilon_{n+1}=\varepsilon_n-\hat{\varepsilon}_n$. Computing the corresponding variance by plugging in the optimal values of $\alpha_n$, $\beta_n$, $Y_n$ yields $$\sigma_{n+1}^2 = \frac{\sigma_n^2}{1+SNR} = \frac{1}{SNR(1+SNR)^n}.$$

Since the power of $\Theta$ is normalized to unity, this is equivalent to signaling over an AWGN channel with $SNR_N=\sigma_N^{-2}$, i.e.

$$SNR_N=SNR\cdot(1+SNR)^{N-1}. \quad (7)$$

Plugging $SNR_N$ into (3) and bounding the Q-function by $$Q(x) < \frac{1}{2}\exp\left(-\frac{1}{2}x^2\right)$$

gives:

$$p_e < \frac{1}{2}\exp\left(-\frac{3}{2}\frac{SNR\cdot(1+SNR)^{N-1}}{2^{2NR}-1}\right).$$

Plugging in the AWGN capacity (1) and removing the "−1" term, we obtain:

$$p_e < \frac{1}{2}\exp\left(-\frac{3}{2}\frac{SNR}{1+SNR}\cdot 2^{2N(C-R)}\right).$$

which is the well-known doubly exponential decay of the error probability of the S-K scheme.

Let us now provide an alternative interpretation of the S-K scheme performance, in terms of the capacity gap attained after a finite number of rounds. Plugging $SNR_N$ in (4) yields:

$$R > \frac{1}{2N}\log\left(1 + \frac{SNR \cdot (1+SNR)^{N-1}}{\Gamma}\right). \quad (8)$$

Plugging the resulting R in the definition of the capacity gap (2) and assuming SNR>>1 yields the following approximation for high SNR:

$$\Gamma_{dB}^{S-K}(p_e, N) \approx \frac{\Gamma_{0,dB}(p_e)}{N}.$$

This behavior is depicted by the dashed curve in FIG. 3.

3.3 Modulo Arithmetic

We briefly overview basic notations and properties of modulo arithmetic. For a given d>0, define the modulo function $$\mathbb{M}_d[x] \stackrel{\text{def}}{=} x - d \cdot \text{round}\left(\frac{x}{d}\right)$$

where the round(•) operator returns nearest integer to its argument[2]. The following properties are easily verified:

[2] We arbitrarily define round $$\left(k + \frac{1}{2}\right) = k + 1$$

for every integer k (i)

$$\mathbb{M}_d[x] \in \left[-\frac{d}{2}, \frac{d}{2}\right)$$

(ii) if $$d_1 + d_2 \in \left[-\frac{d}{2}, \frac{d}{2}\right),$$

then
$$\mathbb{M}_d[\mathbb{M}_d[x+d_1]+d_2-x] = d_1+d_2. \quad (9)$$

otherwise, a modulo-aliasing error term of kd≠0 is added to the right-hand-side (9), for some integer k.

(iii) Let $$V \sim \text{Uniform}\left(\left[-\frac{d}{2}, \frac{d}{2}\right)\right).$$

Then $\mathbb{M}_d[x+V]$ is uniformly distributed over $$\left[-\frac{d}{2}, \frac{d}{2}\right)$$

for any $x \in \mathbb{R}$.

(iv) Therefore, $$\mathbb{E}(\mathbb{M}_d[x+V])^2 = \frac{d^2}{12}.$$

4 The Proposed Scheme

In what follows we assume that the terminals share a common random i.i.d sequence $\{V_n\}_{n=1}^N$ where $$V_n \sim \text{Uniform}\left(\left[-\frac{d}{2}, \frac{d}{2}\right)\right).$$

Furthermore, we set $d = \sqrt{12\tilde{P}}$ which guarantees that $\mathbb{E}(\mathbb{M}_d[x+V_n])^2 = \tilde{P}$ for any $x \in \mathbb{R}$. Recall that the estimation of the PAM point at Terminal B and time instance n is denoted by $\hat{\Theta}_n$, and the associated estimation error by $\varepsilon_n \stackrel{\text{def}}{=} \hat{\Theta}_n - \Theta$. Our scheme is described below.

(A) Initialization:
  Terminal A: Map the message W to a PAM point $\Theta$.
  Terminal A ⇒ Terminal B:
  Send $X_1 = \sqrt{P}\Theta$
  Receive $Y_1 = X_1 + Z_1$
  Terminal B: Initialize the $\Theta$ estimate[3] to $$\hat{\Theta}_1 = \frac{Y_1}{\sqrt{P}}.$$

(B) Iteration:

[3] Note that this is the minimum variance unbiased estimate of $\Theta$.

Terminal B ⇒ Terminal A:
  Given the $\Theta$ estimate $\hat{\Theta}_n$, compute and send
  $\tilde{X}_n = \mathbb{M}_d[\gamma_n \hat{\Theta}_n + V_n]$
  Receive $\tilde{Y}_n = \tilde{X}_n + \tilde{Z}_n$
  Terminal A: Extract a noisy scaled version of estimation error $\varepsilon_n$:
  $$\tilde{\varepsilon}_n = \mathbb{M}_d[\tilde{Y}_n - \gamma_n\Theta + V_n] \quad (10)$$
  Note that $\tilde{\varepsilon}_n = \gamma_n\varepsilon_n + \tilde{Z}_n$, unless a modulo-aliasing error occurs.
  Terminal A ⇒ Terminal B:
  Send a scaled version of $\tilde{\varepsilon}_n$: $X_{n+1} = \alpha\tilde{\varepsilon}_n$, where $\alpha$ is set so that to meet the input power constraint P (computed later).
  Receive $Y_n = X_n + Z_n$
  Terminal B: Update the $\Theta$ estimate[3] $\hat{\Theta}_{n+1} = \hat{\Theta}_n - \hat{\varepsilon}_n$, where
  $\hat{\varepsilon}_n = \beta_{n+1} Y_{n+1}$
  is the MMSE estimate of $\varepsilon_n$. The optimal selection of $\beta_n$ is described in the sequel.

(C) Decoding:
  At time N the receiver decodes the message using a minimum distance decoder for $\hat{\Theta}_N$ w.r.t. the PAM constellation.

5 Main Result

Recall the capacity gap function $\Gamma_0(\cdot)$ of uncoded PAM given in (5). Fix some target error probability $p_e$. Define:

$$\lambda \stackrel{\text{def}}{=} 3\left[Q^{-1}\left(\frac{p_e}{4N}\right)\right]^{-2} \quad (11)$$

-continued $$\Psi_1 \stackrel{def}{=} 1 + (\lambda \cdot \Delta SNR)^{-1}$$

$$\Psi_2 \stackrel{def}{=} \frac{1}{1 - (\lambda \cdot S\tilde{N}R)^{-1}}$$

$$\Psi_3 \stackrel{def}{=} \frac{10/\ln 10}{SNR \cdot \Psi_1^{\frac{N-1}{N}} \Psi_2^{-\frac{N-1}{N}} \Gamma_0^{-\frac{1}{N}}\left(\frac{p_e}{2}\right) - 1}$$

Theorem 1 For a proper choice of parameters, the interactive communication scheme described in Section 4 achieves in N rounds an error probability $p_e$ and a capacity gap $\Gamma^*_{dB}$ satisfying:

$$\Gamma^*_{dB}(p_e, N) < \frac{1}{N}\Gamma_{0,dB}\left(\frac{p_e}{2}\right) + \frac{N-1}{N}(\Psi_{1,dB} + \Psi_{2,dB}) + \Psi_3$$

We prove this theorem is Section 6.

Remark 2 $\lambda$ is a factor that encapsulates the cost of controlling the modulo-aliasing error, as seen below. It decreases with a decreasing $p_e$.

Remark 3 $\Psi_1$ is a penalty term roughly corresponding to the decrease in SNR incurred by trivially concatenating the forward and feedback channels. To see this, consider the concatenated channel from $X_n$ to $\tilde{Y}_n$ where Terminal B performs simple linear scaling to meet the power constraint $\check{P}$, i.e.

$$\check{X}_n = \sqrt{\frac{\check{P}}{P + \sigma_2}} Y_n.$$

The SNR of this channel is $$SNR_{concatenated} \stackrel{def}{=} \frac{SNR \cdot S\tilde{N}R}{SNR + S\tilde{N}R + 1},$$

hence, the associated SNR loss w.r.t. the feedforward channel is $$\frac{SNR}{SNR_{concatenated}} = 1 + \frac{1}{\Delta SNR} + \frac{1}{S\tilde{N}R} \approx 1 + \frac{1}{\Delta SNR}.$$

This latter expression is very similar to $\Psi_1$, with the exception of the additional $\lambda$ factor. Hence, loosely speaking, $\Psi_1$ encapsulates the inherent loss due to essentially employing a feedback scheme over the concatenated channel, together with a feedback power reduction by the amount of $\lambda$ used to avoid modulo-aliasing errors. This loss vanishes for a fixed $p_e$ as $\Delta SNR$ increases. However, if $\Delta SNR$ is fixed, this term does not vanish in the limit of high SNR.

Remark 4 $\Psi_2$ can be interpreted as a penalty term stemming from the modulo-aliasing error endemic to the system, due to the presence of feedback noise in the modulo operations at Terminal A. For a fixed $S\tilde{N}R$, the minimal value of $\lambda$ supported by our scheme is given by $S\tilde{N}R$, which in turn dictates the minimal error probability that can be attained. Due to this error floor, our scheme cannot achieve any rate in the usual sense. The loss of SNR incurred by $\Psi_2$ vanishes for any fixed error probability $p_e$ as $S\tilde{N}R$ increases.

Remark 5 $\Psi_3$ is an additional penalty term (already in logarithmic scale), that result from the fact that we consider the capacity gap in terms of SNR ratios, whereas the explicit term arising from the capacity formula is related to log(1+SNR) rather than log(SNR). Note that $\Psi_3 = O(SNR^{-1})$.

Corollary 1 (High SNR Behavior) Let $\Delta SNR$ and $p_e$ be fixed. The capacity gap attained by our scheme for SNR large enough, can be approximated by $$\Gamma^*_{dB}(p_e, N) \approx \frac{1}{N}\Gamma_{0,dB}\left(\frac{p_e}{2}\right) + \frac{N-1}{N}\left[1 + \frac{1}{\lambda \Delta SNR}\right]_{dB}. \quad (12)$$

The first term is roughly the capacity gap of the S-K scheme with noiseless feedback. The second term pertains to the SNR loss w.r.t. a concatenated channel as well as modulo-aliasing errors, as discussed in Remark 3.

Remark 6 Note that there is a "low SNR" regime (related also to the target error probability or to $\Delta SNR$), where the loss terms $\Psi_{1,dB} + \Psi_{2,dB}$ are larger than say $\Gamma_{0,dB}(p_e)$. In that case, setting $N=1$, namely using an uncoded system with no interaction, is the optimal choice of parameters for our scheme[4]. As we shall see however, for many practical values of SNR, $S\tilde{N}R$ and $p_e$, interaction results in significant gains.

[4] The reason we get the looser $$\Gamma_{0,dB}\left(\frac{p_e}{2}\right)$$

term in (12) is for brevity of exposition; a more accurate trade-off is given in the next section.

6 Proof of Main Result

In Subsection 3.2 we analyzed the error probability of S-K with noiseless feedback, relying on the fact that all the noises are jointly Gaussian, including the noise $\varepsilon_N$ experienced by the PAM decoder. To that end, we were able to directly use the error probability analysis of simple PAM over AWGN discussed in Subsection 3.1.

In the noisy feedback case however, the non-linearity induced by modulo operations at both terminals induce a non-Gaussian distribution of $\varepsilon_N$. An analysis of the decoding error based on the actual distribution of $\varepsilon_N$ is very involved. Yet, an upper bound can be derived via a simple coupling argument described below.

Recall that Terminal A computes $\tilde{\varepsilon}_n$, a noisy scaled version of the estimation error of Terminal B, via a modulo operation (10). For any $n \in \{1, \ldots, N-1\}$ we define $F_n$ as the event where this computation results in a modulo-aliasing error, i.e., $$E_n \stackrel{def}{=} \left\{\gamma_n \varepsilon_n + \tilde{Z}_n \notin \left[-\frac{d}{2}, \frac{d}{2}\right]\right\}. \quad (13)$$

Furthermore, we define $E_N$ as the PAM decoding error event:

$$E_N = \left\{\varepsilon_N \notin \left[-\frac{d_{min}}{2}, \frac{d_{min}}{2}\right]\right\},$$

where $d_{min}$ is the PAM constellation minimal distance. As mentioned above, the distribution of $\varepsilon_N$ is not Gaussian due to the nonlinearity introduced by the modulo operations. To circumvent this, we consider the following upper bound for the error probability:

$$p_e < Pr\left(\bigcup_{n=1}^{N} E_n\right). \quad (14)$$

The inequality stems from the fact that a modulo-aliasing error does not necessarily cause a PAM decoding error.

To proceed, we define the coupled system as a system that is fed by the same message and experiences the (sample-path) exact same noises, with the only difference being that no modulo operations are implemented at neither of the terminals. Clearly, the coupled system violates the power constraint at Terminal B. However, given the message W, all the random variables in the coupled system are jointly Gaussian, and in particular, the estimation errors $\varepsilon_n$ in that system are Gaussian for n=1, ..., N. Moreover, it is easy to see that the estimation errors are sample-path identical between the original system and the coupled system until the first modulo-aliasing error occurs. To be precise:

Lemma 1 Let $\widetilde{\Pr}$ denote the probability operator in for the coupled process. Then for any N>1:

$$Pr\left(\bigcup_{n=1}^{N} E_n\right) = \widetilde{\Pr}\left(\bigcup_{n=1}^{N} E_n\right).$$

Proof:

$$Pr\left(\bigcup_{n=1}^{N} E_n\right) = Pr(E_1) + \sum_{n=2}^{N} Pr\left(\bigcap_{i=1}^{n-1}(E_i^C) \cap E_n\right).$$

Moreover, for any $i \in \{2, \ldots, N\}$ $$Pr\left(\bigcap_{i=1}^{n-1}(E_i^C) \cap E_n\right) = \widetilde{\Pr}\left(\bigcap_{i=1}^{n-1}(E_i^C) \cap E_n\right)$$

and trivially $Pr(E_1) = \widetilde{\Pr}(E_1)$, which concludes the proof.

Combining the above with (14) and applying the union bound in the coupled system, we obtain $$p_e \leq \sum_{n=1}^{N} \widetilde{\Pr}(E_n). \quad (15)$$

Calculating the above probabilities now involves only scalar Gaussian densities, which significantly simplifies the analysis.

6.1 Calculation of the Parameters

We set $\gamma_n$ such that $\widetilde{\Pr}(E_1) = \ldots = \widetilde{\Pr}(E_{n-1}) \stackrel{\text{def}}{=} p_m$, for some $p_m$ small enough to be set later. Specifically, recalling the definition (13) and that $d = \sqrt{12\tilde{P}}$, and since $\tilde{\varepsilon}_n = \gamma_n \varepsilon_n + \tilde{Z}_n$ in the coupled system is Gaussian, we obtain the following equation for $\gamma_n$:

$$p_m = 2Q\left(\sqrt{\frac{3\tilde{P}}{\widetilde{\mathbb{E}}\tilde{\varepsilon}_n^2}}\right), \quad (16)$$

and hence $$\gamma_n = \sqrt{\frac{\lambda \tilde{P} - \tilde{\sigma}^2}{\sigma_n^2}}, \quad (17)$$

where $\lambda$ is defined $$\lambda \stackrel{\text{def}}{=} 3\left[Q^{-1}\left(\frac{p_m}{2}\right)\right]^{-2}$$

Remark 7 $\lambda$ defined in (11) is a special case of the above with $$p_m = \frac{p_e}{2N}.$$

Note again that $\lambda > S\tilde{N}R^{-1}$ must hold, which lower bounds the attainable error probability, see Remark 4.

$\alpha$ is set so that the input power constraint at Terminal A is met, namely $P \geq \widetilde{\mathbb{E}} X_n^2 = \alpha^2 \widetilde{\mathbb{E}} \tilde{\varepsilon}_n^2$. From (16) it stems that:

$$\alpha = \sqrt{\frac{P}{\lambda \tilde{P}}}.$$

Remark 8 It should be emphasized that this calculation is accurate for the coupled system only. In the original system, a modulo-aliasing error may cause the power constraint to be violated. However, since $\varepsilon_n^2 \leq 3\tilde{P}$ and since the probabilities of modulo-aliasing errors are set to be very low (lower then the target error probability) the power constraint violation is negligible, and can be practically ignored; e.g., for $p_e = 10^{-6}$ and N=20, the increase in average power due to this effect is lower than $10^{-4}$ dB. We also note in passing that the power constraint in Terminal B is always satisfied (regardless of parameter choice), due to dithering.

The parameter $\beta_n$ determines the evolution of the estimation error. The linear estimate of $\varepsilon_n$: $\hat{\varepsilon}_n = \beta_{n+1} Y_{n+1}$, is the optimal estimate in the coupled system, in which $\varepsilon_n$ and $Y_{n+1}$ are jointly Gaussian. We would thus like to minimize $\widetilde{\mathbb{E}}(\varepsilon_n - \hat{\varepsilon}_n)^2$. Plugging in $Y_{n+1} = \alpha(\gamma_n \varepsilon_n + \tilde{Z}_n) + Z_{n+1}$ and solving the optimization problem yields:

$$\beta_{n+1} = \frac{\sigma_n}{\sigma} \frac{\sqrt{SNR \cdot \left(1 - \frac{1}{\lambda S\tilde{N}R}\right)}}{1 + SNR},$$

where $\sigma_n^2$ is the variance of $\varepsilon_n$ in the coupled system. Recalling that $\varepsilon_{n+1} = \varepsilon_n - \hat{\varepsilon}_n$ and computing the MMSE for the optimal choice of $\beta_{n+1}$ above, we obtain a recursive formula for $\sigma_n^2$, which boils down to the following expression for the SNR after N iterations:

$$SNR_N \stackrel{\text{def}}{=} \frac{1}{\sigma_N^2} = SNR \cdot \left(1 + SNR \cdot \frac{1 - \frac{1}{\lambda S\tilde{N}R}}{1 + \frac{1}{\lambda \Delta SNR}}\right)^{N-1}, \quad (18)$$

and using (15), the error probability is bounded by $$p_e < (N-1)p_m + 2Q\left(\sqrt{\frac{3SNR_N}{2^{2NR}-1}}\right). \quad (19)$$

Juxtaposing (18) and (7) shows that in the noisy feedback case, the exponential growth of the SNR with the number rounds is dampened by a factor that is inversely related to SNR and ΔSNR, and also related to the term λ that is in turn determined by the modulo-aliasing error probability. This factor corresponds to $\Psi_1$, $\Psi_2$ in Theorem 1, where $\Psi_3$ is a remainder term obtained by pedestrian manipulations and the inequality $$-\ln(1-x) \le \frac{x}{x-1} \text{ for } x < 1.$$

The result in Theorem 1 was obtained for the specific choice $$p_m = \frac{p_e}{2N}$$

of the modulo-aliasing error. In general, reducing $p_m$ decreases λ which in turn decreases $SNR_N$, and hence increases the second addend on the right-hand-side of (19), resulting in a trade-off that could potentially be further optimized.

7 Numerical Results

The behavior of the capacity gap for our scheme as a function of the number of interaction rounds and ΔSNR is depicted in FIG. 3 and FIG. 4, for "high SNR" and "low SNR" setups. In both figures we plotted the capacity gap, for a target rate R and a target error probability $p_e=10^{-6}$, where the SNR corresponding to R was found by numeric search on (8), and the capacity gap calculated by definition (2). We can see that the higher ΔSNR, the smaller the capacity gap, where ΔSNR=30 dB is close to noiseless feedback. The points marked $n_{opt}$ are those for which the capacity gap is less than 0.2 dB above the minimal value attained. In FIG. 3, R=1, and can see that ΔSNR=10 dB reduces the capacity gap to 4.2 dB in 12 iterations, and ΔSNR=20 dB reduces the capacity gap to 1.1 dB in 22 iterations. In FIG. 4 R=4 and for ΔSNR=10 dB the capacity gap to 3.5 dB in 11 iterations, and ΔSNR=20 dB reduces the capacity gap to 0.8 dB in 19 iterations. Observing (12) we can see that for high SNR the result is only a function of ΔSNR, thus does not depend on the target rate or the base SNR.

8 Notes on Implementation

The scheme described in this paper is simple and practical, as opposed to its noiseless feedback counterparts. This provides impetus for further discussing implementation related aspects. The following conditions should be met for our results to carry merit: 1) Information asymmetry: Terminal A has substantially more information to convey than Terminal B; 2) SNR asymmetry: The SNR of the feedforward channel is lower than the SNR of the feedback channel. This can happen due to differences in power constraints and/or path losses; 3) Complexity/delay constraints: There are severe complexity or delay constraint at Terminal A; 4) Two-way signaling: Our scheme assumes sample-wise feedback. The communication system should therefore be full duplex where both terminals have virtually the same signaling rate; hence, the terminals split the bandwidth between them even though only Terminal A is transmitting information. This situation can sometimes be inherent to the system, but should otherwise be tested against the (non-interactive) solution where the entire bandwidth is allocated to Terminal A. This choice of forward vs. feedback bandwidth allocation yields a system trade-off that is SNR dependent: Terminal A can use our scheme and achieve a rate of $C(SNR_{dB}-\Gamma^*_{dB})$, or alternatively employ FEC over the full forward-feedback bandwidth, thereby doubling the forward signaling rate but also incurring a 3 dB loss in SNR and a potentially larger capacity gap $\Gamma_{dB}^{FEC}$, resulting in a rate of $2C(SNR_{dB}-3$ dB$-F_{dB}^{FEC})$. It can therefore be seen that our solution is generally better for low enough SNR. For instance, for $p_e=10^{-6}$ and ΔSNR>30 dB our scheme outperforms (with comparable complexity and delay) full bandwidth uncoded PAM for any SNR<23 dB, and outperforms (with significantly smaller complexity and delay) full bandwidth FEC with $\Gamma_{dB}^{FEC}=3$ dB for any SNR<9 dB.

The use of very large PAM constellations, whose size is exponential in the product of rate and interaction rounds, seemingly requires extremely low noise and distortion at the digital and analog circuits in Terminal A, which may appear to impose a major implementation obstacle. Fortunately, this is not the case. The full resolution implied by the constellation size is by construction confined only to the original message Θ and the final estimate $\hat{\Theta}_N$; the transmitted and received signals in the course of interaction can be safely quantized at a resolution determined only by the channel noise (and not the final estimation noise), as in commonplace communication systems. Figuratively speaking, the source bits are revealed along the interaction process, where the number of bits revealed in every round is determined by the channel SNR. This desirable property has also been confirmed in simulations.

Another important implementation issue is sensitivity to model assumptions. We have successfully verified the robustness of the proposed scheme in several reasonable scenarios including correlative noise, excess quantization noise, and multiplicative channel estimation noise. The universality of the scheme and its performance for a wider range of models remains to be further investigated.

9 Discussion

Note that so far we have limited our discussion to the PAM symbol error rate $p_e$. The bit-error rate is in fact lower, since an error in PAM decoding affects only a single bit with high probability (6), assuming Gray labeling. However, note that the modulo-aliasing error will typically result in many erroneous bits, and hence optimizing the bit error rate does not yield a major improvement over its upper bound $p_e$. Further fine-tuning of the scheme can be obtained by non-uniform power allocation over interaction rounds in both Terminal A and B; in particular, we note that Terminal B is silent in the last round, which can be trivially leveraged. We also note in passing that our scheme can be used in conjunction with FEC as an outer code, to achieve other power/delay/complexity/error probability tradeoffs.

We note again that for any choice of SNR and ΔSNR, the error probability attained by our scheme cannot be made to vanish with the number interaction rounds while maintaining a non-zero rate, as in the noiseless feedback S-K scheme case. The reason is that (17) implies a minimal attainable error probability dictated by the modulo-aliasing incurred by feedback noise. Equivalently, one cannot get arbitrarily close to capacity for a given target error probability; the reason is that while increasing the number of iterations would increase $SNR_N$ and reduce the PAM decoding error term in (19), it would also increase the modulo-aliasing error term in (19). Hence, our scheme is not capacity achieving in the usual sense. However, it can get close to capacity in the sense of reducing the capacity gap using a very short block length, typically N≈20 in the examples presented. To the best of our knowledge, FEC schemes require a block length typically larger by two order of magnitudes to reach the same gap at the same error probability. Consequently, the encoding delay of our scheme is also markedly lower than that of competing FEC schemes. Alternatively, compared to a minimal delay uncoded system under the same error probability, our scheme operates at a much lower capacity gap for a wide regime of settings, and hence can be significantly more power efficient.

Another important issue is that of encoding and decoding complexity. Our proposed scheme applies only a two multiplications and one modulo operation at each terminal in each interaction round. This is markedly lower than the encoding/decoding complexity of FEC, even if non-optimal methods such as iterative decoding are employed.

We claim:

1. A method for receiving and decoding a message, the method comprises:
   receiving, by a second terminal, a first received signal; wherein the first received signal represents a first transmitted signal that was transmitted from a first terminal and propagated over a noisy feedforward channel; wherein the first transmitted signal represents a portion of a message;
   calculating, by the second terminal, a first estimate of the portion of the message;
   calculating, by the second terminal, a representation of the first estimate; wherein the calculating of the representation of the first estimate comprises applying a second modulo function;
   transmitting, by the second terminal, over a feedback channel, the representation of the first estimate;
   repeating, for each iteration out of multiple iterations, the steps of:
     receiving, by the second terminal, a current received signal; wherein the current received signal represents an estimated error; wherein the estimated error was calculated by the first terminal in response to an outcome of a pervious iteration and calculating the estimated error comprises applying a first modulo function;
     calculating, by the second terminal, and in response to the current received signal, a current estimate of the message;
     calculating, by the second terminal, a representation of the current estimate; wherein the calculating of the representation of the current estimate comprises applying the second modulo function; and
     transmitting, by the second terminal and over the feedback channel, the representation of the current estimate; and
   estimating the portion of the message, by the second terminal, and after a completion of the multiple iterations, wherein the estimating of the portion of the message is responsive to at least one outcome of at least one iteration.

2. The method according to claim 1 wherein the calculating of each representation of the current estimate comprises calculating a scaled version of the current estimate modulo a fixed interval.

3. The method according to claim 2 wherein the calculating the scaled version of the current estimate modulo the fixed interval is responsive to power constraints.

4. The method according to claim 1 wherein the calculating of each representation of the current estimate comprises calculating a sum of a dither signal and the current estimate and applying the second modulo operation on the sum.

5. The method according to claim 1 wherein the first transmitted signal is pulse amplitude modulated.

6. The method according to claim 1 wherein the first transmitted signal is quadrature amplitude modulated.

7. The method according to claim 1 wherein the first transmitted signal is pulse position modulated.

8. The method according to claim 1 wherein the first transmitted signal is phase shift keying modulated.

9. The method according to claim 1 wherein the first transmitted signal is continuous phase modulated.

10. The method according to claim 1 wherein the estimating of the portion of the message comprises applying an unmasking function, the unmasking function reverses a masking function applied by the first terminal on the portion of the message.

11. The method according to claim 10 wherein the applying of the unmasking function comprises subtracting a known content.

12. The method according to claim 10 wherein the applying of the unmasking function comprises subtracting a content that is generated by a predefined process known to the first and second terminals.

13. A method for receiving and decoding a message, the method comprises:
   receiving, by a second terminal, a first received signal; wherein the first received signal represents a first transmitted signal that was transmitted from a first terminal and propagated over a noisy feedforward channel; wherein the first transmitted signal is a dummy signal;
   calculating, by the second terminal, a first estimate of the dummy signal;
   calculating, by the second terminal, a representation of the first estimate of the dummy signal wherein the calculating of the representation of the first estimate comprises applying a second modulo function;
   transmitting, by the second terminal, over a feedback channel, the representation of the first estimate;
   repeating, for each iteration out of multiple iterations, the steps of:
     receiving, by the second terminal, a current received signal; wherein the current received signal represents an estimated error; wherein the estimated error was calculated by the first terminal in response to an outcome of a pervious iteration and in response to a portion of a message and calculating the estimated error comprises applying a first modulo function;
     calculating, by the second terminal, and in response to the current received signal, a current estimate of the message;
     calculating, by the second terminal, a representation of the current estimate; wherein the calculating of the representation of the current estimate comprises applying the second modulo function; and
     transmitting, by the second terminal and over the feedback channel, the representation of the current estimate; and
   estimating the portion of the message, by the second terminal, and after a completion of the multiple iterations, wherein the estimating of the portion of the message is responsive to at least one outcome of at least one iteration.

14. The method according to claim 13 wherein the dummy signal has a content of the portion of the message and an intensity that does not exceed a noise level of the feedforward channel.

15. The method according to claim 13 wherein the dummy signal has a content that is set regardless of a content of the portion of the message.

16. The method according to claim 13 wherein the first transmitted signal is quadrature amplitude modulated.

17. The method according to claim 13 wherein the first transmitted signal is pulse position modulated.

18. A non-transitory computer readable medium that stores instructions that once executed by a second terminal, causes the second terminal to perform the steps of: receiving, by a second terminal, a first received signal; wherein the first received signal represents a first transmitted signal that was transmitted from a first terminal and propagated over a noisy feedforward channel; wherein the first transmitted signal represents a portion of a message; calculating, by the second terminal, a first estimate of the portion of the message; calculating, by the second terminal, a representation of the first estimate; wherein the calculating of the representation of the first estimate comprises applying a second modulo function; transmitting, by the second terminal, over a feedback channel, the representation of the first estimate; repeating, for each iteration out of multiple iterations, the steps of: receiving, by the second terminal, a current received signal; wherein the current received signal represents an estimated error; wherein the estimated error was calculated by the first terminal in response to an outcome of a pervious iteration and calculating the estimated error comprises applying a first modulo function; calculating, by the second terminal, and in response to the current received signal, a current estimate of the message; calculating, by the second terminal, a representation of the current estimate; wherein the calculating of the representation of the current estimate comprises applying the second modulo function; and transmitting, by the second terminal and over the feedback channel, the representation of the current estimate; and estimating the portion of the message, by the second terminal, and after a completion of the multiple iterations, wherein the estimating of the portion of the message is responsive to at least one outcome of at least one iteration.

19. A second terminal that comprises a processor , a receiver and a transmitter, wherein the receiver is configured to receive a first received signal; wherein the first received signal represents a first transmitted signal that was transmitted from a first terminal and propagated over a noisy feedforward channel; wherein the first transmitted signal represents a portion of a message; wherein the processor is configured to calculate a first estimate of the portion of the message; calculate a representation of the first estimate; wherein the calculating of the representation of the first estimate comprises applying a second modulo function; wherein the transmitter is configured to transmit over a feedback channel, the representation of the first estimate; wherein the second terminal is configured to repeat, for each iteration out of multiple iterations, the steps of: receiving, by the receiver, a current received signal; wherein the current received signal represents an estimated error; wherein the estimated error was calculated by the first terminal in response to an outcome of a pervious iteration and calculating the estimated error comprises applying a first modulo function; calculating, by the processor, and in response to the current received signal, a current estimate of the message; calculating, by the processor, a representation of the current estimate; wherein the calculating of the representation of the current estimate comprises applying the second modulo function; and transmitting, by the transmitter and over the feedback channel, the representation of the current estimate; wherein the processor is further configured to estimate the portion of the message after a completion of the multiple iterations, wherein the estimating of the portion of the message is responsive to at least one outcome of at least one iteration.

* * * * *